US011453797B2

(12) United States Patent
Okamoto et al.

(10) Patent No.: US 11,453,797 B2
(45) Date of Patent: Sep. 27, 2022

(54) INK SET AND METHOD FOR PRODUCING PRINTED MATTER

(71) Applicants: TOYO INK SC HOLDINGS CO., LTD., Tokyo (JP); TOYOCOLOR CO. LTD., Tokyo (JP)

(72) Inventors: Mayuko Okamoto, Tokyo (JP); Kazuhiro Jonai, Tokyo (JP); Atsushi Yoda, Tokyo (JP); Norio Suzuki, Tokyo (JP)

(73) Assignees: TOYO INK SC HOLDINGS CO., LTD., Tokyo (JP); TOYOCOLOR CO., LTD, Tokyo (JP)

( * ) Notice: Subject to any disclaimer, the term of this patent is extended or adjusted under 35 U.S.C. 154(b) by 472 days.

(21) Appl. No.: 16/630,583

(22) PCT Filed: Jul. 13, 2018

(86) PCT No.: PCT/JP2018/026564
§ 371 (c)(1),
(2) Date: Jan. 13, 2020

(87) PCT Pub. No.: WO2019/013337
PCT Pub. Date: Jan. 17, 2019

(65) Prior Publication Data
US 2020/0157370 A1    May 21, 2020

(30) Foreign Application Priority Data

Jul. 14, 2017 (JP) .............................. JP2017-137567

(51) Int. Cl.
*C09D 11/033* (2014.01)
*C09D 11/322* (2014.01)
*C09D 11/326* (2014.01)
*C09D 11/54* (2014.01)
*C08K 5/053* (2006.01)
*C08K 3/28* (2006.01)

(52) U.S. Cl.
CPC ................ *C09D 11/54* (2013.01); *C08K 3/28* (2013.01); *C08K 5/053* (2013.01); *C09D 11/033* (2013.01); *C09D 11/322* (2013.01); *C09D 11/326* (2013.01); *C08K 2003/287* (2013.01)

(58) Field of Classification Search
CPC .......... B41J 2/01; B41M 5/00; B41M 5/0011; B41M 5/0017; B41M 5/0047; B41M 5/50; B41M 7/00; C09D 11/033; C09D 11/106; C09D 11/107; C09D 11/322; C09D 11/326; C09D 11/38; C09D 11/40; C09D 11/54; C08K 3/28; C08K 5/053; C08K 2003/287
See application file for complete search history.

(56) References Cited

U.S. PATENT DOCUMENTS

| 2007/0056118 A1 | 3/2007 | Ellis |
| 2008/0071007 A1 | 3/2008 | Spinelli |
| 2010/0149231 A1 | 6/2010 | Mori et al. |
| 2013/0115431 A1* | 5/2013 | Aoyama .............. C09D 11/322 347/100 |
| 2015/0274992 A1 | 10/2015 | Aoyama et al. |
| 2015/0344713 A1 | 12/2015 | Mizushima et al. |
| 2016/0244626 A1 | 8/2016 | Kagata et al. |

FOREIGN PATENT DOCUMENTS

| EP | 3 403 840 A1 | | 11/2018 | |
| JP | 2000-238422 A | | 9/2000 | |
| JP | 2000-335084 A | | 12/2000 | |
| JP | 101294015 | * | 10/2008 | ............. C09D 11/38 |
| JP | 2009-137056 A | | 6/2009 | |
| JP | 2009-241304 A | | 10/2009 | |
| JP | 2010-089270 A | | 4/2010 | |
| JP | 2010-142965 A | | 7/2010 | |
| JP | 2012-131108 A | | 7/2012 | |
| JP | 2013-188958 A | | 9/2013 | |
| JP | 2014-139298 A | | 7/2014 | |
| JP | 2015-101690 A | | 6/2015 | |
| JP | 104789040 | * | 7/2015 | ........... C09D 11/037 |
| JP | 2015-187236 A | | 10/2015 | |

OTHER PUBLICATIONS

Japanese Notice of Reasons for Refusal issued in JP 2017-137567 dated Apr. 10, 2018.
Japanese Notice of Reasons for Refusal issued in JP 2017-137567 dated Jun. 19, 2018.
International Search Report of PCT/JP2018/026564 dated Aug. 28, 2018.
Communication dated Jun. 19, 2020 by the European Patent Office in Application No. 18831299.5.
Communication dated Mar. 16, 2022, by the EPO in European Application No. 18831299.5.

* cited by examiner

*Primary Examiner* — Anh T Vo
(74) *Attorney, Agent, or Firm* — Sughrue Mion, PLLC

(57) ABSTRACT

An ink set containing an inkjet ink and a treatment liquid, wherein the inkjet ink contains a pigment, a water-soluble organic solvent, a surfactant and water, the water-soluble organic solvent contains an alkyl diol (A) of 2 to 8 carbon atoms, the weighted average boiling point of the water-soluble organic solvent at one atmosphere is from 175 to 240° C., the surfactant contains an acetylenediol-based surfactant, the treatment liquid contains a coagulant, calcium nitrate is included as the coagulant in an amount of 6.8 to 20.8% by mass relative to the total mass of the treatment liquid, and the pH of the treatment liquid is from 2 to 11.

14 Claims, No Drawings

INK SET AND METHOD FOR PRODUCING PRINTED MATTER

CROSS REFERENCE TO RELATED APPLICATIONS

This application is a National Stage of International Application No. PCT/JP2018/026564 filed Jul. 13, 2018, claiming priority based on Japanese Patent Application No. 2017-137567 filed Jul. 14, 2017, the entire contents of which are incorporated by reference herein.

TECHNICAL FIELD

The present invention relates to an ink set composed of a treatment liquid and an inkjet ink which is capable of producing high-quality images by inkjet printing at high speed and at a high recording resolution, regardless of the recording medium. Further, the present invention also relates to a method for producing printed matter using the ink set.

BACKGROUND ART

Inkjet printing is a recording method in which liquid droplets of an inkjet ink that have been jetted from an inkjet head are jetted directly onto a recording medium to form text or images. Unlike conventional plate-based printing techniques such as offset printing and gravure printing, inkjet printing has characteristics that include not requiring plate-making and being compatible with variable printing, simple operation and adjustment of the printing apparatus, and little noise during printing. Inkjet printing is widely used in offices and households, and has recently also been showing increased demand in industrial applications.

The inkjet inks used in inkjet printing are classified into solvent inks, aqueous inks and UV-curable inks and the like depending on the ink composition. In recent years, there has been a growing movement to restrict the use of organic solvents and photosensitive monomers that can be harmful to people and the environment, and as a result, there is a growing demand for the replacement of solvent inks and UV-curable inks that use these types of restricted materials with aqueous inks.

The liquid component in an aqueous inkjet ink contains water as the main component, and in order to control the wetting of the recording medium and the drying properties, typically also contains an added water-soluble organic solvent such as glycerol or a glycol. When an aqueous inkjet ink containing these liquid components is used for printing (applying the ink to form) a pattern of text and/or images onto a recording medium, the ink dries as a result of the liquid components penetrating into the recording medium and/or evaporating from the recording medium, thereby fixing the ink components to the recording medium.

On the other hand, recording media used in inkjet printing, broadly classified in terms of material, include fabrics, papers, and plastics and the like. Among these, the amount of paper produced is large, and in the case of paper, high-speed printing is required and high-image quality is also necessary. A large variety of papers exist, from papers having high permeability such as high-quality papers and recycled papers, through to papers having low permeability such as coated papers and art papers. In order to further expand the demand for inkjet printing, the development of aqueous inkjet inks that can be used on recording media composed of all manner of materials is a large task for those skilled in the art.

However, conventional aqueous inkjet inks have the low viscosity characteristic of inkjet inks, and also have a high surface tension due to the water. As a result, particularly in those cases where the above type of ink is used to print to a paper substrate having low permeability, a phenomenon occurs in which ink dots mix together and flow, causing dot fusion and color mixing. Accordingly, conventional aqueous inkjet inks have been unable to produce the type of high-image quality printed matter obtainable with solvent inks and UV-curable inks.

One known countermeasure for the above problem is a method in which the recording medium is treated with a treatment liquid. Generally known treatment liquids for aqueous inkjet inks are of two types: treatment liquids that form a layer (an ink-receiving layer) that absorbs liquid components in the inkjet ink and improves the drying properties (see Patent Documents 1 to 4), and treatment liquids that form a layer (an ink aggregation layer) that initially causes aggregation of solid components contained in the ink such as the colorant and resins, thereby preventing bleeding between liquid droplets and improving the image quality (see Patent Document 5).

However, in methods that employ an ink-receiving layer, because the thickness of the layer must be considerably large, the texture of the recording medium may sometimes deteriorate. Further, deterioration in the density and color gamut due to absorption of the ink by the ink-receiving layer, and bleeding or color mixing due to variations in the amount of absorption may sometimes occur. On the other hand, in methods that employ an ink aggregation layer, although the ability of the recording medium to receive the liquid components is inferior, the ink can be fixed on the surface of the ink aggregation layer without any significant impairment of the texture of the recording medium, and therefore printing at high density with a broad range of color rendering is possible. Furthermore, provided the ink aggregation layer can be applied uniformly, ink dot fusion can be suppressed, and the ink dots can be formed with an ideal circular form.

Patent Document 5 discloses a treatment liquid containing a divalent inorganic salt. In the examples of Patent Document 5, calcium acetate or magnesium chloride is used as the coagulant. However, when treatment liquids containing these coagulants are used to perform high-speed printing, a satisfactory aggregation (color mixing suppression) effect cannot be achieved.

In contrast, another possible method involves increasing the coating amount of the treatment liquid in order to achieve a satisfactory aggregation effect. However, because the amounts of water and organic solvent applied also increase, drying of the treatment liquid slows, and there is a possibility that the subsequently printed ink may be transferred to the back surface of another recording medium that is stacked on the recording medium during printing, thus causing a deterioration in the print quality. Of course, when the coating amount is reduced, the aggregation effect may not manifest satisfactorily, resulting in a deterioration in the density and color gamut in the case of highly permeable recording media.

In addition, another possible method involves increasing the amount of coagulant in the treatment liquid in order to achieve a better aggregation effect. However, this can cause other problems, such as insufficient spreading of the ink, inadequate coverage of solid printed portions and the appearance of white bands, leading to a deterioration in the print quality.

As outlined above, in the conventional technology relating to ink sets containing a treatment liquid and an inkjet ink, achieving the type of high density and broad color gamut obtainable in offset printed mater, and obtaining high-image quality that suffers none of the image defects characteristic of aqueous inkjet inks such as color mixing, recording medium exposure and banding, regardless of the recording medium being used, and even when performing inkjet printing at high speed and at high recording resolution, has proven difficult.

PRIOR ART DOCUMENTS

Patent Documents

Patent Document 1: JP 2000-238422 A
Patent Document 2: JP 2000-335084 A
Patent Document 3: JP 2012-131108 A
Patent Document 4: JP 2009-241304 A
Patent Document 5: JP 2013-188958 A

SUMMARY OF INVENTION

Problems Invention Aims to Solve

The present invention has been developed in light of the above circumstances, and provides an ink set containing a treatment liquid and an inkjet ink which, when performing inkjet printing at high speed and at high recording resolution to a variety of paper media, exhibits satisfactory density and color gamut, and inhibits image defects such as color mixing caused by dot coalescence and recording medium exposure and banding caused by insufficient coverage, and thereby is capable of producing high-quality images. The present invention also provides a method for producing printed matter of high image quality using the ink set.

Means for Solution of the Problems

As a result of intensive research aimed at resolving the issues described above, the inventors of the present invention discovered that an ink set composed of an inkjet ink containing an organic solvent of a specific structure and a surfactant of a specific structure, and a treatment liquid containing a specific amount of calcium nitrate as a coagulant and having a liquid pH within a specific range was able to address the above issues, thus enabling them to complete the present invention.

In other words, the present invention relates to the following aspects. However, the present invention is not limited to the following embodiments, and includes a variety of embodiments.

One embodiment relates to an ink set containing an inkjet ink and a treatment liquid used in combination with the inkjet ink, wherein
the inkjet ink contains a pigment, a water-soluble organic solvent, a surfactant and water,
the water-soluble organic solvent contains an alkyl diol (A) of 2 to 8 carbon atoms,
the surfactant contains an acetylenediol-based surfactant,
the treatment liquid contains a coagulant,
calcium nitrate is included as the coagulant in an amount of 6.8 to 20.8% by mass relative to the total mass of the treatment liquid, and
the pH of the treatment liquid is within a range from 2 to 11.

In one embodiment, the weighted average boiling point of the water-soluble organic solvent at one atmosphere is preferably within a range from 175 to 240° C.

In one embodiment, the pH of the treatment liquid is preferably from 3.5 to 11.

In one embodiment, the treatment liquid preferably also contains an organic solvent. The organic solvent preferably includes less than 10% by mass of organic solvent having a boiling point at one atmosphere of at least 240° C. relative to the total mass of the treatment liquid.

In one embodiment, the inkjet ink preferably also contains a pigment dispersing resin.

In one embodiment, the acid value of the pigment dispersing resin is preferably within a range from 30 to 300 mgKOH/g.

In one embodiment, the acid value of the pigment dispersing resin is preferably from 100 to 300 mgKOH/g.

In one embodiment, the pigment dispersing resin is preferably a water-soluble pigment dispersing resin, and the weight average molecular weight (Mw) of that resin preferably satisfies $10{,}000 \leq Mw \leq 40{,}000$.

In one embodiment, the alkyl diol (A) preferably has 3 to 6 carbon atoms.

In one embodiment, the treatment liquid preferably also contains a pH adjuster.

In one embodiment, the viscosity of the treatment liquid is preferably within a range from 5 to 100 mPa·s.

In one embodiment, the amount of the calcium nitrate is preferably within a range from 7.0 to 20.5% by mass relative to the total mass of the treatment liquid.

Another embodiment relates to a method for producing inkjet ink printed matter that uses the ink set of one of the embodiments described above, the method including:
a step of applying the treatment liquid to a recording medium formed from a paper substrate or a synthetic paper substrate, and
a step of applying the inkjet ink by one-pass printing to a portion to which the treatment liquid has been applied.

In one embodiment, the step of applying the treatment liquid to the recording medium is preferably conducted so that the amount of calcium ions on the surface of the recording medium is within a range from 0.5 to 5 mmol/m$^2$.

Another embodiment relates to a printed matter obtained by printing the ink set according to an embodiment described above to a recording medium.

Effects of the Invention

The present invention provides an ink set using a specific treatment liquid which, when performing inkjet printing at high speed and at high recording resolution to a variety of paper media, exhibits satisfactory density, and inhibits image defects such as color mixing caused by dot coalescence and recording medium exposure and banding caused by insufficient coverage, and thereby is capable of producing high-quality images. Further, even after a long period of time has elapsed, images of similar superior image quality to those obtained during the initial stages of printing can be obtained by high-speed printing, and therefore the productivity of high-quality printed matter can be dramatically improved. Moreover, a method for producing printed matter of high image quality using the ink set can also be provided.

EMBODIMENTS FOR CARRYING OUT THE INVENTION

Preferred embodiments of the present invention are described below in further detail. However, the embodiments described below merely describe examples of the present invention. The present invention is in no way limited by the following embodiments, and also includes all manner of modifications that can be made within the scope of the invention.

1. Ink Set

One embodiment relates to an ink set, wherein the ink set contains an inkjet ink (hereafter sometimes referred to as simply "the ink") containing a pigment, a water-soluble organic solvent, a surfactant and water, and a treatment liquid containing a coagulant. In one embodiment, the ink set satisfies the following conditions (i) and (ii).

(i) In the inkjet ink, the water-soluble organic solvent contains an alkyl diol (A) of 2 to 8 carbon atoms, and the surfactant contains an acetylenediol-based surfactant.

(ii) In the treatment liquid, the coagulant contains calcium nitrate, the amount of the calcium nitrate is within a range from 6.8 to 20.8% by mass relative to the total mass of the treatment liquid, and the pH of the treatment liquid is within a range from 2 to 11.

As described in relation to the conventional technology, in inkjet printing, methods that combine a treatment liquid and an inkjet ink are already in use, but in the present invention, as described above, a combination of a treatment liquid and an inkjet ink containing specific materials and having specific properties is used. The effects of that combination are described below.

The treatment liquid is applied to a recording medium prior to printing of the inkjet ink, and is used for forming an ink aggregation layer on the recording medium. It is thought that the calcium nitrate contained in the ink aggregation layer formed using the treatment liquid (hereafter also referred to as simply "the treatment liquid layer (of the present invention)") dissolves in the presence of an aqueous medium, and dissociates to form nitrate ions and calcium ions. Accordingly, when the inkjet ink is printed and the liquid droplets of the ink contact the treatment liquid layer, the calcium ions derived from the calcium nitrate dissociation and are eluted into the liquid droplets of the inkjet ink. These calcium ions diffuse through the ink droplets and exist in a dissolved and/or dispersed state, causing anion-cation interactions with solid components having an anionic charge such as the pigment and resins, and altering the state of adsorption. As a result, it is thought that aggregation and precipitation of the solid components and a localized increase in viscosity occur due to a deterioration in the above dissolved and/or dispersed state.

In this description, an "aqueous medium" means a medium formed from a liquid that contains at least water.

Examples of other known coagulants besides calcium nitrate that generate the type of aggregation action described above include cationic resins, acidic compounds and inorganic salts other than calcium nitrate. In the ink set of the present invention, calcium nitrate is preferably selected as the coagulant. The reasons for this preference include the superior aggregation action of calcium ions, and the characteristic of nitrate ions that yields a large endothermic energy upon dissolution in an aqueous medium. In other words, when calcium nitrate dissociates, thermal energy must be absorbed from the ink droplets, and therefore it is thought that compared with the other coagulants mentioned above, when calcium nitrate is used, a period of time in the order of microseconds is required for the dissociation and elution. As a result, it is thought that the coverage improves due to wet spreading of the ink droplets, and that the image density improves due to flattening of the surface of the liquid droplets.

On the other hand, as a result of the endothermic reaction during dissociation and elution of the calcium nitrate, the temperature of the ink droplets decreases. As a result, the viscosity and surface tension of the ink increase, meaning it is expected that within the order of microseconds, adequate wet spreadability will not occur. In response to this issue, in the ink set of the present invention, a combination of the alkyl diol (A) of 2 to 8 carbon atoms and the acetylenediol-based surfactant is used within the components that constitute the ink used in combination with the treatment liquid.

Detailed reasons as to why the combination of the ink containing the above components and the treatment liquid described above yields such favorable characteristics remain unclear, but are thought to include the following. First, the acetylenediol-based surfactant exhibits an extremely high orientation speed at the air-liquid interface. As a result, even if the ink viscosity and surface tension vary somewhat, there is little effect on the speed of orientation at the ink droplet surface or the rate of wet spreading of the ink droplets. In addition, it is also thought that because rapid orientation with the ink droplets occurs, coalescence of the ink droplets can be suppressed.

Furthermore, the acetylenediol-based surfactant and the alkyl diol (A) of 2 to 8 carbon atoms are both organic compounds having two hydroxyl groups within a single molecule, and are thought to exhibit structural affinity. Accordingly, it is thought that the acetylenediol-based surfactant can exist uniformly and stably within the ink, meaning microscopic fluctuations in the abundance do not occur, enabling excellent printed image quality to be achieved continuously regardless of the printing conditions or printing speed. Moreover, it is thought that the hydroxyl groups that exist in the alkyl diol (A) of 2 to 8 carbon atoms and the acetylenediol-based surfactant electrostatically repel the nitrate ions that exist in the treatment liquid layer, meaning the ink does not penetrate into the interior of the recording medium, but rather spreads uniformly across the surface of the recording medium.

In one embodiment, the amount of the calcium nitrate that exists in the treatment liquid is preferably within a range from 6.8 to 20.8% by mass relative to the total mass of the treatment liquid. As a result of intensive investigation, the inventors of the present invention discovered that by adjusting the blend amount of the calcium nitrate to a value within this range, the synergistic effects with the components that constitute the ink could be enhanced, enabling images of high image quality to be obtained in a stable manner regardless of the recording medium, the printing speed and the recording resolution. Moreover, when the pH of the treatment liquid is adjusted to a value within a range from 2 to 11, the treatment liquid is prevented from becoming strongly acidic or strongly basic. As a result, it is thought that excessive acceleration of the aggregation action can be suppressed, enabling images of high image quality with no coverage problems to be obtained.

As described above, it is thought that by combining the above treatment liquid and the above ink, satisfactory image density can be obtained regardless of the printing conditions, and images of high image quality with good suppression of image defects such as color mixing, unsatisfactory coverage and banding can be obtained. It should be noted that the mechanisms described above are merely conjecture, and in no way limit the present invention.

Next, the constituent elements of the ink set are described in further detail.

1A. Treatment Liquid

In one embodiment, the treatment liquid described above contains at least a coagulant, and the coagulant contains at least calcium nitrate. The constituent components of the treatment liquid are described below in further detail.

<Calcium Nitrate>

The treatment liquid contains calcium nitrate as a coagulant. Among the various possible coagulants, in those cases where calcium nitrate is used, dissolution and/or dispersion on the recording medium of the solid components that exist in the inkjet ink is reduced, and by causing aggregation and precipitation of the solid components, together with localized thickening, color mixing caused by ink droplet coalescence can be ameliorated, and images of high image quality can be more easily obtained regardless of the printing conditions. As described above, the calcium ions generated upon dissociation of the calcium nitrate have a low molecular weight, and move readily within the ink droplets. Further, the valence of the ions is divalent, meaning compared with monovalent cations, the aggregation action and insolubilization capability are superior. Accordingly, calcium ions that have dissociated inside the ink droplets immediately move to the uppermost portions of the ink droplets, and can reduce the dissolution and/or dispersion action of the solid components having an anionic charge such as the pigment and the resins. As a result, even during high-speed printing, color mixing is unlikely to occur, and printed matter of high image quality can be obtained. Moreover, as a result of the large endothermic energy upon dissolution in aqueous media that represents a characteristic of nitrate salts, combination of the treatment liquid with the ink described above enables high-quality images having satisfactory image density to be obtained.

Furthermore, as mentioned above, in one embodiment, the blend amount of the calcium nitrate in the treatment liquid is preferably within a range from 6.8 to 20.8% by mass relative to the total mass of the treatment liquid. By employing such an embodiment, the synergistic effects with the inkjet ink can be further enhanced, and images of high image quality can be obtained in a stable manner. Further, from the viewpoint of achieving excellent image quality with no bleeding equivalent to that obtainable with offset printing, even with high-speed printing, the above blend amount is preferably from 7.0 to 20.5% by mass. In addition, from the viewpoint of obtaining particularly superior printed matter in terms of the aggregation and coverage, even with high-speed printing, the above blend amount is particularly preferably from 7.5 to 20% by mass. The blend amount of the calcium nitrate mentioned above represents the blend amount as anhydrous calcium nitrate.

<Treatment Liquid pH>

In one embodiment, the pH of the treatment liquid is within a range from 2 to 11. When the pH of the treatment liquid falls within this range, the treatment liquid is preventing from being strongly acidic, meaning excessive acceleration of the aggregation effect can be suppressed, and images of high image quality that do not suffer from inadequate coverage yet exhibit excellent aggregation can be obtained with ease. Further, damage such as corrosion of the materials used for the printing device housing the treatment liquid, and particularly metal members, can be suppressed. Moreover, from the viewpoints of enhancing the above effects, and enabling printed matter of high density and high image quality to be obtained across a broader range of ink compositions, the pH range is preferably from 3.5 to 11. In particular, if the pH is within a range from 4 to 8, then the corrosive action against of all manner of metals and the wettability of a variety of recording media can be maintained at favorable levels for long periods of time. Accordingly, from the viewpoint of obtained coated products with no irregularities in stable manner, even in those cases where coating and application to the recording medium occurs over a long period of time, and cases where treatment liquid that has been standing for a long period is used, the above pH range could be said to be the most preferred pH range.

The above pH can be measured by conventional methods, for example, by using a desktop pH meter F-72 manufactured by Horiba, Ltd., and either a standard ToupH electrode or a sleeve ToupH electrode.

<Characteristics of Treatment Liquid>

In one embodiment, the treatment liquid has a viscosity at 25° C. within a range from 5 to 100 mPa·s. Provided the viscosity of the treatment liquid satisfies this range, the treatment liquid can be applied without coating irregularities, and the various printing methods described below can be employed. Further, even in the case of high-speed printing, regardless of the treatment liquid coating method used, from the viewpoints of achieving uniform application of the treatment liquid and obtaining printed matter of high image quality, the viscosity of the treatment liquid at 25° C. is more preferably within a range from 5 to 80 mPa·s, even more preferably from 5 to 60 mPa·s, and most preferably from 5 to 30 mPa·s.

Depending on the viscosity of the treatment liquid, measurement of the viscosity of the treatment liquid may be performed, for example, using an E-type viscometer (TVE25L viscometer, manufactured by Toki Sangyo Co., Ltd.) or a B-type viscometer (TVB10 viscometer, manufactured by Toki Sangyo Co., Ltd.).

In order to ensure satisfactory wettability of a variety of recording media, the surface tension of the treatment liquid at 25° C. is preferably within a range from 20 to 75 mN/m, more preferably from 21 to 65 mN/m, and particularly preferably from 24 to 45 mN/m. Further, as described below, the surface tension of the treatment liquid is preferably at least as high as the surface tension of the inkjet ink.

The surface tension of the treatment liquid can be measured, for example, using a surface tensiometer (CBVPZ manufactured by Kyowa Interface Science Co., Ltd.), using the platinum plate method in an atmosphere at 25° C.

<pH Adjuster>

In one embodiment, in order to achieve a value within the desired pH range, the treatment liquid may also include a pH adjuster. A pH adjuster is a material that suppresses pH fluctuations caused by environmental changes, such as a reduction in pH caused by the absorption of carbon dioxide from the atmosphere, and has the function of maintaining the pH of the treatment liquid at a constant level. Any compound having a pH-adjusting function may be selected and used as the pH adjuster.

For example, in those cases where basification is required, although there are no particular limitations, alkanolamines such as dimethylethanolamine, diethanolamine, triethanolamine and N-methyldiethanolamine; other primary amines, secondary amines, tertiary amines and quaternary ammonium salts; ammonia water; alkali metal hydroxides such as lithium hydroxide, sodium hydroxide and potassium hydroxide; alkali metal carbonates such as lithium carbonate, sodium carbonate, sodium hydrogen carbonate and potassium carbonate; and alkali metal acetates such as lithium acetate and sodium acetate may be used.

Further, in those cases where acidification is required, although there are no particular limitations, various inorganic acids such as hydrochloric acid, sulfuric acid, nitric acid, phosphoric acid and boric acid; and various organic acids such as acetic acid, citric acid, succinic acid, tartaric acid, malic acid, fumaric acid, malonic acid, ascorbic acid and glutamic acid may be used. Any of the above pH adjusters may be used alone, or a combination of two or more pH adjusters may be used.

Among the various possibilities, in terms of not affecting the aggregation action of the calcium nitrate, a pH adjuster that does not contain a metal ion component is preferred. Specifically, in those cases where the treatment liquid requires basification, an alkanolamine or ammonia water is preferably selected. Further, in those cases where the treatment liquid requires acidification, an inorganic acid or organic acid is preferably selected.

In one embodiment, the treatment liquid may include two or more pH adjusters. By including two or more pH adjusters, the suppression effect on pH fluctuations caused by environmental changes can be enhanced, and even when using a treatment liquid that has been stored for a long period, and even during high-speed printing, images of high image quality similar to those initially obtained can be obtained. From the viewpoint of achieving favorable manifestation of these effects, the combination of two or more pH adjusters is preferably a combination of a material capable of basification of the treatment liquid and a material capable of acidification of the treatment liquid. From this viewpoint, in one embodiment, it is particularly preferable that the treatment liquid contains a combination of at least one material selected from among the alkanolamines and ammonia water mentioned above, and at least one material selected from among the inorganic acids and organic acids mentioned above.

The blend amount of the pH adjuster is preferably within a range from 0.01 to 5% by mass relative to the total mass of the treatment liquid. By ensuring that the blend amount of the pH adjuster falls within this range, pH adjustment of the treatment liquid is possible without impairing the function of the calcium nitrate in the treatment liquid. Further, a blend amount within the above range is also preferred in terms of safety and odor. Moreover, in terms of maintaining the pH in a stable manner even during lengthy or continuous anchor coating, and ensuring satisfactory drying properties for the treatment liquid even during high-speed coating, the above blend amount is more preferably within a range from 0.15 to 3% by mass.

In one embodiment, in those cases where a combination of a material capable of basification of the treatment liquid and a material capable of acidification of the treatment liquid is used as a pH adjuster, if the blend amount of the material capable of acidification of the treatment liquid is deemed to be 1, then the blend amount of the material capable of basification of the treatment liquid is preferably within a range from 1 to 2.5, and more preferably from 1.2 to 2.

From the viewpoint of preventing drying and solidification inside the coating device during the treatment liquid coating process, the boiling point of the pH adjuster is preferably at least 50° C. On the other hand, from the viewpoint of preventing any deterioration in the drying properties during high-speed printing, the boiling point of the pH adjuster is preferably not higher than 400° C.

The molecular weight of the above pH adjuster, expressed as a weight average molecular weight (Mw), is preferably not more than 500. By using a pH adjuster having this type of molecular weight, coating irregularities of the treatment liquid during high-speed printing can be improved, and the viscosity of the treatment liquid can be kept within the preferred range. In those cases where the pH adjuster is composed of a single material, the above weight average molecular weight may be read as the molecular weight of the single material.

<Organic Solvent>

In one embodiment, the treatment liquid may also contain an organic solvent. By including an organic solvent, the moisture retention, drying properties and wetting properties of the treatment liquid can be further improved. Although there are no particular limitations on the organic solvents that may be used in the treatment liquid, inclusion of a water-soluble organic solvent is preferred. These organic solvents are deemed to not include the pH adjusters described above.

From the viewpoints of the affinity with water and calcium nitrate, and the solubility of the calcium nitrate, the water-soluble organic solvent used in the treatment liquid is preferably a water-soluble organic solvent containing at least one hydroxyl group in the molecular structure.

Specific examples of water-soluble organic solvents that can be used favorably in the treatment liquid include the following:

monohydric alcohols such as methanol, ethanol, 1-propanol, 2-propanol, 1-butanol, 2-butanol, 3-methoxy-1-butanol, and 3-methoxy-3-methyl-1-butanol;

dihydric alcohols (glycols) such as 1,2-ethanediol (ethylene glycol), 1,2-propanediol (propylene glycol), 1,3-propanediol, 1,2-butanediol, 1,3-butanediol, 1,4-butanediol, 1,2-pentanediol, 1,5-pentanediol, 1,2-hexanediol, 1,6-hexanediol, 1,2-heptanediol, 2,2-dimethyl-1,3-propanediol, 2-methyl-1,3-propanediol, 2-ethyl-2-methyl-1,3-propanediol, 3-methyl-1,3-butanediol, 3-methyl-1,5-pentanediol, 2-methyl-2-propyl-1,3-propanediol, 2-methylpentan-2,4-diol, 2-ethyl-1,3-hexanediol, 1,2-octanediol, diethylene glycol, triethylene glycol, dipropylene glycol, butylene glycol, and dibutylene glycol;

trihydric alcohols such as glycerol; and glycol monoalkyl ethers such as ethylene glycol monoethyl ether, ethylene glycol monobutyl ether, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol monobutyl ether, dipropylene glycol monopropyl ether, tripropylene glycol monomethyl ether, and tripropylene glycol monoethyl ether.

Among the compounds listed above, the use of a monohydric alcohol such as ethanol, 1-propanol, 2-propanol, 3-methoxy-1-butanol or 3-methoxy-3-methyl-1-butanol is particularly preferred.

Further, a single water-soluble organic solvent having one or more hydroxyl groups in the molecular structure may be used alone, or a combination of two or more such organic solvents may be used.

In one embodiment, the blend amount of the water-soluble organic solvent having one or more hydroxyl groups in the molecular structure contained in the treatment liquid, relative to the total mass of the treatment liquid, is preferably within a range from 0.1 to 30% by mass, more preferably from 1 to 25% by mass, and particularly preferably from 1 to 20% by mass. By adjusting the blend amount of the water-soluble organic solvent so as to fall within the above range, a treatment liquid having excellent moisture retention and superior drying properties and wetting properties can be obtained easily. Further, regardless of the printing method used for the treatment liquid, stable printing can be achieved over long periods.

In one embodiment, the treatment liquid may also include other organic solvents, and specific examples of other organic solvents that may be used include the following:

glycol dialkyl ethers such as diethylene glycol dimethyl ether, diethylene glycol methyl ethyl ether, diethylene glycol butyl methyl ether, diethylene glycol diethyl ether, triethylene glycol dimethyl ether, triethylene glycol methyl ethyl ether, triethylene glycol butyl methyl ether, triethylene glycol diethyl ether, tetraethylene glycol dimethyl ether, tetraethylene glycol methyl ethyl ether, tetraethylene glycol butyl methyl ether, and tetraethylene glycol diethyl ether;

nitrogen-containing solvents such as 2-pyrrolidone, N-methylpyrrolidone, N-ethylpyrrolidone, ε-caprolactam, 3-methyl-2-oxazolidinone, 3-ethyl-2-oxazolidinone, N,N-dimethyl-β-methoxypropionamide, N,N-dimethyl-β-ethoxypropionamide, N,N-dimethyl-β-butoxypropionamide, N,N-dimethyl-β-pentoxypropionamide, N,N-dimethyl-β-hexoxypropionamide, N,N-dimethyl-β-heptoxypropionamide, N,N-dimethyl-β-2-ethylhexoxypropionamide, N,N-dimethyl-β-octoxypropionamide, N,N-diethyl-β-butoxypropionamide, N,N-diethyl-β-pentoxypropionamide, N,N-diethyl-β-hexoxypropionamide, N,N-diethyl-β-heptoxypropionamide, and N,N-diethyl-β-octoxypropionamide; and heterocyclic compounds such as γ-butyrolactone, γ-valerolactone, δ-valerolactone, and ε-caprolactone.

One of the organic solvents listed above may be used alone, or a combination of two or more solvents may be used.

The total blend amount of the other organic solvents described above in the treatment liquid, relative to the total mass of the treatment liquid, is preferably within a range from 0.1 to 50% by mass, more preferably from 0.15 to 30% by mass, and particularly preferably from 0.2 to 25% by mass. By adjusting the blend amount of the above other water-soluble organic solvents so as to fall within the above range, a treatment liquid having excellent moisture retention, drying properties and wetting properties can be more easily obtained for the treatment liquid.

In one embodiment, the amount of organic solvents having a boiling point of 240° C. or higher in the treatment liquid is preferably less than 10% by mass relative to the total mass of the treatment liquid. The amount of these solvents may be 0% by mass. By ensuring either that the treatment liquid contains no organic solvents having a boiling point of 240° C. or higher, or if such solvents are present, that the blend amount is adjusted to a value within the above range, satisfactory drying of the treatment liquid can be achieved during high-speed printing. Further, when the ink is printed, the amount of residual organic solvent in the paper medium is satisfactorily low relative to the amount of calcium nitrate. As a result, even in the case of high-speed printing, the aggregation action of the calcium nitrate is still able to manifest satisfactorily. When calculating the amount of organic solvents having a boiling point of 240° C. or higher, even the amounts of those water-soluble organic solvents having one or more hydroxyl groups within the molecular structure that have a boiling point of 240° C. or higher are included within the calculation of the amount of the aforementioned organic solvents having a boiling point of 240° C. or higher. In one embodiment, the amount of organic solvents having a boiling point of 240° C. or higher in the treatment liquid is more preferably not more than 8% by mass, even more preferably not more than 5% by mass, and particularly preferably 2% by mass or less.

<Surfactant>

In one embodiment, the treatment liquid described above preferably also contains a surfactant in order to adjust the surface tension and improve the wettability of the recording medium. Many types of surfactants exist, including nonionic surfactants, anionic surfactants and cationic surfactants, but in the case of the treatment liquid described above, a nonionic surfactant is preferably selected. When a nonionic surfactant is used, the wetting properties of the treatment liquid can be easily improved without impairing the aggregation function of the calcium nitrate.

Many types of nonionic surfactants are known, including acetylene-based, siloxane-based, acrylic-based and fluorine-based surfactants, which may be selected in accordance with the application. From the viewpoints of achieving favorable wettability of the recording medium by the treatment liquid, good wetting properties for the subsequently applied inkjet ink, and easy improvement in the printing stability of the treatment liquid, the use of a siloxane-based and/or acetylene-based surfactant is preferred, and the use of at least an acetylene-based surfactant is particularly preferred.

The surfactant that is used may be synthesized using conventional methods, or a commercially available product may be used. When the surfactant is selected from among commercially available products, examples of siloxane-based surfactants that can be used include BY16-201, FZ-77, FZ-2104, FZ-2110, FZ-2162, F-2123, L-7001, L-7002, SF8427, SF8428, SH3749, SH8400, 8032 Additive and SH3773M (all manufactured by Dow Corning Toray Co., Ltd.), TEGO Glide 410, TEGO Glide 432, TEGO Glide 435, TEGO Glide 440, TEGO Glide 450, TEGO Twin 4000, TEGO Twin 4100, TEGO Wet 250, TEGO Wet 260, TEGO Wet 270 and TEGO Wet 280 (all manufactured by Evonik Degussa GmbH), SAG-002 and SAG-503A (manufactured by Nissin Chemical Co., Ltd.), BYK-331, BYK-333, BYK-345, BYK-346, BYK-347, BYK-348, BYK-349, BYK-UV3500, and BYK-UV3510 (all manufactured by BYK-Chemie GmbH), and KF-351A, KF-352A, KF-353, KF-354L, KF355A, KF-615A, KF-640, KF-642, and KF-643 (all manufactured by Shin-Etsu Chemical Co., Ltd.).

Further, examples of acetylene-based surfactants that can be used include Surfynol 61, 104E, 104H, 104A, 104BC, 104DPM, 104PA, 104PG-50, 420, 440, 465, 485, SE and SE-F, and Dynol 604 and 607 (all manufactured by Air Products and Chemicals, Inc.), and OLFINE E1004, E1010, E1020, PD-001, PD-002W, PD-004, PD-005, EXP. 4001, EXP. 4200, EXP. 4123 and EXP. 4300 (all manufactured by Nissin Chemical Co., Ltd.).

One of the above surfactants may be used alone, or a combination of two or more surfactants may be used.

In the coating method described below, in order to form a uniform aggregation layer, it is necessary that the surfactant orients rapidly at the surface, and lowers and stabilizes the surface tension. From these viewpoints, inclusion of a compound represented by general formula (1) shown below as the acetylene-based surfactant is particularly desirable.

[Chemical formula 1]

General formula (1)

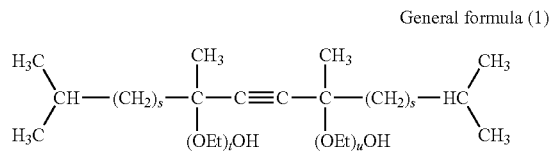

In general formula (1), s represents an integer of 1 to 3, t represents an integer of 0 or greater, u represents an integer of 0 or greater, and t+u is an integer of 1 to 30. Further, Et represents an ethylene group. Among the various possibilities, compounds of general formula (1) in which s is 1 or 2 and t+u is an integer of 2 to 20 are more preferred. Compounds of general formula (1) in which s is 2 and t+u is an integer of 3 to 15 are the most desirable.

Among the commercially available surfactants listed above, examples of compounds represented by the above general formula (1) include Surfynol 420, 440, 465 and 485, Dynol 604 and 607, and OLFINE E1004 and E1010. Among these, Surfynol 465 and Dynol 607 are more preferred, and Dynol 607 is the most desirable. Dynol 607 corresponds with a compound of general formula (1) in which s is 2, and t+u represents an integer of 3 to 15.

In one embodiment, in those cases where the treatment liquid contains a surfactant, the amount added of the surfactant, relative to the total mass of the treatment liquid, is preferably at least 0.1% by mass but not more than 3.0% by mass, and particularly preferably at least 0.15% by mass but not more than 2.0% by mass. By adding the surfactant in an amount that falls within the above range, satisfactory wetting of the recording medium can be achieved regardless of the coating method and even in the case of high-speed printing, and any deterioration in the coating quality such as cissing can be suppressed. However, the blend amount of the surfactant must be determined with due consideration of the surface tension of the inkjet ink described below.

In the ink set, from the viewpoint of preventing bleeding in the printed matter, the surface tension of the treatment liquid is preferably at least as high as the surface tension of the inkjet ink. By ensuring that the surface tension of the treatment liquid is greater than the surface tension of the inkjet ink, the amount of surfactant oriented at the coating film surface when applying the treatment liquid to the recording medium can be reduced, and any excessive reduction in the surface energy of the treatment liquid layer can be prevented. As a result, the wettability of the subsequently printed inkjet ink is favorable, and printed matter of high image quality with no bleeding can be obtained.

<Binder Resin>

In one embodiment, the treatment liquid may also contain a binder resin. A binder resin is a resin that does not participate in the reaction between the inkjet ink and the treatment liquid. By also including a binder resin, the water resistance of the printed matter can be improved, meaning the printed matter can be used in a variety of different applications. Generally, water-soluble resins and resin microparticles are known as binder resins. Either of these types of binder resins may be used in the treatment liquid. In terms of mixing instantly with the inkjet ink, thereby enabling the aggregation function of the treatment liquid to manifest more effectively during high-speed printing, selection of a water-soluble resin is preferred.

The amount of the above binder resin is specified relative to the amount of metal ions. Specifically, the mass ratio of the amount of the above binder resin relative to the amount of metal ions contained in the treatment liquid is preferably greater than 0 but less than 50, and is particularly preferably greater than 0 but less than 30. When the mass ratio falls within this range, the water resistance of the printed matter improves, and printed matter of high image quality can be obtained, with no waviness (a phenomenon in which a portion of the recording medium absorbs water, leading to localized expansion and the formation of a wave-like shape) or curling (curving of the recording medium caused by moisture).

There are no particular limitations on the types of binder resins that may be used in the treatment liquid. Among the various possible resins, nonionic water-soluble resins are preferred due to their effectiveness in improving the water resistance and suppressing waviness and curling. Further, provided the basic performance of the treatment liquid can be maintained, a resin that also includes an added anionic unit or cationic unit in the nonionic water-soluble resin may be used. Specific examples of the binder resin include polyethyleneimines, polyamides, various quaternary ammonium salt group-containing water-soluble resins, polyacrylamides, polyvinylpyrrolidones, polyalkylene oxides, starches, water-soluble celluloses such as methyl cellulose, hydroxy cellulose, carboxymethyl cellulose, hydroxymethyl cellulose, hydroxypropyl cellulose and hydroxypropyl methylcellulose, polyvinyl methyl ethers, polyvinyl acetals, polyvinyl alcohols, and modified products of the above resins. Further, provided stability with the calcium nitrate is maintained, acrylic resins, styrene-acrylic resins, maleic acid resins, styrene-maleic acid resins, urethane resins, and ester resins may also be used. The acrylic resins may be methacrylic resins. Resins having a low acid value can be used particularly favorably, but the present invention is, of course, not limited to such resins.

In terms of being able to absorb the liquid components in the subsequently printed inkjet ink, thereby improving the drying properties, particularly during high-speed printing, the use of at least one resin selected from the group consisting of polyvinyl alcohols, polyvinylpyrrolidones, polyvinyl acetals, polyalkylene oxides, cellulose derivatives and styrene-acrylic resins as the binder resin is preferred. Polyvinyl alcohols and/or low-acid value styrene-acrylic resins are particularly preferred. These resins offer the advantages of having the types of physical properties required for inkjet ink treatment liquids, such as favorable transparency, coating film durability and binder strength to pigments, being readily available, and being available in a variety of forms including modified products, and are therefore particularly desirable.

Moreover, in the case of polyvinyl alcohols, in terms of enabling suppression of any reduction in the pH of the treatment liquid over time, it is most desirable to use a polyvinyl alcohol having a degree of saponification of at least 95%. In other words, when a polyvinyl alcohol having a degree of saponification of at least 95% and/or a low-acid value styrene-acrylic resin is used as the binder resin, in addition to the effects of improving the water resistance and suppressing waviness and curling, a treatment liquid layer of excellent gloss, transparency and inkjet ink absorption can be obtained, and a treatment liquid that exhibits excellent pH stability over time can be obtained.

In one embodiment, the number average molecular weight (Mn) of the binder resin used in the treatment liquid is preferably within a range from 3,000 to 90,000, and particularly preferably from 4,000 to 86,000. Binder resins having Mn value within this range generally exhibit the desired water resistance. Further, waviness or curling of the recording medium caused by swelling of the treatment liquid is less likely to occur. Furthermore, the calcium ions are able to move satisfactorily, meaning the aggregation effect is not impaired. Moreover, by using a binder resin having Mn value within the above range, the viscosity of the treatment liquid can be easily adjusted to a value within the preferred range.

The number average molecular weight of the binder resin can be measured by typical methods. In one example, Mn can be measured as a polystyrene-equivalent number average molecular weight, using a TSKgel column (manufactured by Tosoh Corporation) and a GPC (HLC-8120GPC, manufactured by Tosoh Corporation) fitted with an RI detector, using THF as the eluent.

<Water>

In one embodiment, the treatment liquid preferably contains water, and the amount of water is preferably within a range from 10 to 90% by mass relative to the total mass of the treatment liquid.

<Other Components>

The treatment liquid may, if necessary, also contain other additives such as antifoaming agents and preservatives in order to achieve certain desired physical property values. In those cases where these types of additives are used, the amount added is preferably at least 0.01% by mass but not more than 10% by mass relative to the total mass of the treatment liquid.

<Method for Producing Treatment Liquid>

In one embodiment, the treatment liquid contains calcium nitrate and water, and may also contain, as required, a pH adjuster, organic solvent, binder resin, surfactant and components selected appropriately from among the aforementioned additives, and can be produced by a method in which these components are combined and then stirred and mixed, and the resulting mixture is then filtered if required. However, the method for producing the treatment liquid is not limited to this method.

During the step of conducting stirring and mixing, the mixture may be heated at a temperature within a range from 40 to 100° C. if necessary. However, in those cases where resin microparticles are used as the binder resin, the heating is preferably performed at a temperature lower than the MFT (minimum film-forming temperature) of the resin microparticles.

Further, during the filtration step, although there are no particular limitations on the filter pore size, provided that coarse particles and dust can be removed, the filter pore size is preferably from 0.3 to 100 μm, and more preferably from 0.5 to 50 μm. When filtration is performed, a single type of filter may be used, or a combination of a plurality of filters may be used.

1B. Inkjet Ink

The constituent elements of the inkjet ink are described below in further detail.

<Pigment>

In one embodiment, the inkjet ink preferably contains a pigment as the colorant. Pigments have favorable water resistance, light resistance, weather resistance and gas resistance and the like, and when used with the treatment liquid of the embodiment described above during high-speed printing, exhibit a faster aggregation speed than dyes. Conventional organic pigments and inorganic pigments may be used as the pigment. The amount of these pigments, relative to the total mass of the inkjet ink, is preferably at least 2% by mass but not more than 15% by mass, more preferably at least 2.5% by mass but not more than 12% by mass, and particularly preferably at least 3% by mass but not more than 10% by mass. By ensuring that the pigment content falls within the above range, satisfactory color development can be achieved even with one-pass printing. Further, the viscosity of the inkjet ink can be kept within a range that is appropriate for inkjet printing, and as a result, the long-term printing stability can be favorably maintained. Specific examples of the pigment are listed below.

Examples of cyan organic pigments that can be used in the present invention include C.I. Pigment Blue 1, 2, 3, 15:3, 15:4, 15:6, 16, 22, 60, 64 and 66. Of these, in terms of offering superior color development and light resistance, the selection of one or more of C.I. Pigment Blue 15:3 and/or 15:4 is preferred.

Examples of magenta organic pigments include C.I. Pigment Red 5, 7, 12, 22, 23, 31, 48 (Ca), 48 (Mn), 49, 52, 53, 57 (Ca), 57:1, 112, 122, 146, 147, 150, 185, 238, 242, 254, 255, 266, 269 and 282, and C.I. Pigment Violet 19, 23, 29, 30, 37, 40, 43 and 50.

Of these, in terms of offering superior color development and light resistance, one or more pigments selected from the group consisting of C.I. Pigment Red 122, 150, 185, 266, 269 and 282 and C.I. Pigment Violet 19 is particularly preferred. In particular, at least one pigment selected from the group consisting of C.I. Pigment Red 150 and 185 and C.I. Pigment Violet 19 exhibits color reproducibility close to Japan Color 2011 and the European Color Standard FOGRA39, and yields particularly superior color development properties when used in combination with the treatment liquid of the embodiment described above, and is consequently particularly desirable.

Examples of yellow organic pigments include C.I. Pigment Yellow 10, 11, 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185 and 213. Of these, in terms of offering superior color development, one or more pigments selected from the group consisting of C.I. Pigment Yellow 13, 14, 74, 120, 139, 180, 185 and 213 is preferred.

Examples of black organic pigments include aniline black, Lumogen black, and azomethine azo black. Further, a plurality of color pigments selected from among the cyan pigments, magenta pigments and yellow pigments described above, and special color pigments such as the orange pigments, green pigments and brown pigments described below, may also be used to form a black pigment.

In one embodiment, special color pigments such as orange pigments, green pigments and brown pigments may also be used as the pigment for the inkjet ink. Specific examples include C.I. Pigment Orange 16, 36, 43, 51, 55, 59, 61, 64 and 71, C.I. Pigment Green 7, 36, 43 and 58, and C.I. Pigment Brown 23, 25 and 26. By using these special color pigments, printed matter having an even broader color gamut can be produced.

There are no particular limitations on the types of inorganic pigments that may be used. Examples include black pigments such as carbon blacks and iron oxide, and white pigments such as titanium oxide.

The carbon black pigment may be a carbon black produced using the furnace method or the channel method. Of the various carbon blacks, a carbon black having properties including a primary particle size of 11 to 50 nm, a specific surface area measured by the BET method of 50 to 400 m²/g, a volatile fraction of 0.5 to 10% by mass, and a pH of 2 to 10 is preferred.

Examples of commercially available products having these types of properties include: No. 25, 30, 33, 40, 44, 45, 52, 850, 900, 950, 960, 970, 980, 1000, 2200B, 2300, 2350 and 2600, and MA7, MA8, MA77, MA100 and MA230 (manufactured by Mitsubishi Chemical Corporation), RAVEN 760UP, 780UP, 860UP, 900P, 1000P, 1060UP, 1080UP and 1255 (manufactured by Columbian Carbon Company), REGAL 330R, 400R, 660R and MOGUL L (manufactured by Cabot Corporation), and Nipex 1601Q, 1701Q, 35 and 75, PrinteX 30, 35, 40, 45, 55, 75, 80, 85, 90, 95 and 300, Special Black 350 and 550, and Nerox 305, 500, 505, 600 and 605 (manufactured by Orion Engineered Carbons S.A.), and any of these carbon blacks can be used favorably.

Titanium oxide can be used favorably as a white inorganic pigment, and either the anatase form or rutile form may be used, but use of the rutile form is preferred from the viewpoint of increasing the opacity of the printed matter. Further, titanium oxide produced by either the chlorine method or the sulfuric acid method may be used, but using titanium oxide produced by the chlorine method is preferred in terms of obtaining a higher degree of whiteness.

The use of titanium oxide having a surface that has been treated with an inorganic compound and/or an organic compound is preferred. Examples of the inorganic compound include compounds containing one or more of silicon, aluminum, zirconium, tin, antimony and titanium, as well as hydrates of these compounds. Further, examples of the organic compound include polyhydric alcohols and alkanolamines and derivatives thereof, higher fatty acids and metal salts thereof, and organometallic compounds. Among these, polyhydric alcohols and derivatives thereof yield a high degree of hydrophobization of the titanium oxide surface, enabling an improvement in the dispersion stability, and can therefore be used particularly favorably.

In order to adjust the hue or color development of the printed matter to a desired range, a mixture of a plurality of the above pigments may be used. For example, in order to improve the color tone at low print ratios, a small amount of one or more pigments selected from among cyan organic pigments, magenta organic pigments, orange organic pigments and brown organic pigments may be added to a black ink that uses a carbon black pigment.

<Pigment Dispersing Resin>

In the inkjet ink, examples of methods for stably dispersing the above pigment and maintaining that dispersion include: (1) methods of achieving dispersion by adsorbing a water-soluble pigment dispersing resin to the pigment surface, (2) methods of achieving dispersion by adsorbing a water-soluble and/or water-dispersible surfactant to the pigment surface, (3) methods of chemically or physically introducing a hydrophilic functional group at the pigment surface, thereby achieving dispersion in the ink without requiring a pigment dispersing resin or a surfactant (self-dispersing pigments), and (4) methods of achieving dispersion in the ink by coating the pigment with a water-insoluble resin, and also using a water-soluble pigment dispersing resin or surfactant as required.

In the inkjet ink, the pigment is preferably dispersed using a method other than the above method (3) (namely, a method for producing a self-dispersing pigment). The ink set of the present invention intentionally uses the insolubilization caused by the calcium ions of the treatment liquid to suppress image defects such as color mixing. Accordingly, enabling anion-cation interaction reactions and adsorption equilibrium movement reactions between the calcium ions and the high-molecular weight components such as the aforementioned pigment dispersing resin and surfactant enhances the thickening and fluidity reduction effects caused by the pigment component, enabling the image defects mentioned above to be suppressed even during high-speed printing.

Moreover, of the methods described above, the selection of method (1) or (4) is preferred. In other words, the pigment is more preferably dispersed using a pigment dispersing resin. Selecting the above method (1) that uses a water-soluble pigment dispersing resin is particularly desirable.

With the method for dispersing the pigment using a pigment dispersing resin, by appropriate investigation and selection of the composition and molecular weights of the monomers that constitute the pigment dispersing resin, the resin adsorption capability to the pigment and the electric charge of the pigment dispersing resin can be easily adjusted. As a result, the pigment dispersing resin is able to impart good dispersion stability to fine pigments, and can control the ability of the treatment liquid to reduce the dispersibility of the pigment. The above term "pigment dispersing resin" is defined as a generic term for resins that contribute to dispersion of the pigment, including the water-soluble pigment dispersing resins used in the above method (1) or (4), and the water-insoluble resins used in the above method (4).

There are no particular limitations on the type of pigment dispersing resin, and examples of resins that may be used include acrylic resins, styrene-acrylic resins, maleic acid resins, styrene-maleic acid resins, urethane resins, and ester resins. In the same manner as mentioned above, methacrylic resins may also be used for the acrylic resins. In one embodiment, in terms of having a greater range of selectable materials, in terms of ease of synthesis, and in terms of achieving an appropriate aggregation speed due to the charge neutralization and insolubilization of the calcium nitrate, the use of an acrylic resin or a styrene-acrylic resin is particularly preferred. The pigment dispersing resin may be synthesized using a conventional method, or a commercially available resin may be used.

In one embodiment, the pigment dispersing resin preferably includes an introduced alkyl group of 8 to 36 carbon atoms. When the alkyl group in the pigment dispersing resin has 8 to 36 carbon atoms, the viscosity of the pigment dispersion can be lowered, superior dispersion stability can be achieved, and better viscosity stability can be more easily achieved. Further, the thickening and fluidity reduction effects caused by the pigment component following the anion-cation interaction reaction or adsorption equilibrium movement reaction with the calcium ions are extremely large.

The number of carbon atoms in the alkyl group is preferably from 10 to 34, more preferably from 12 to 30, and even more preferably from 18 to 24. Provided the number of carbon atoms in the alkyl group is within the range from 8 to 36, the group may be linear or branched. Although either type of group may be used, a linear alkyl group is preferred. Examples of the linear alkyl group include an octyl group (C8), decyl group (C10), lauryl group (C12), myristyl group (C14), cetyl group (C16), stearyl group (C18), arachyl group (C20), behenyl group (C22), lignoceryl group (C24), cerotoyl group (C26), montanyl group (C28), melissyl group (C30), dotriacontanyl group (C32), tetratriacontanyl group (C34), and hexatriacontanyl group (C36).

In one embodiment, from the viewpoint of achieving a combination of reduced viscosity for the pigment dispersion and improved coating film durability and gloss for the printed matter, the amount of the structural unit derived from the monomer having an alkyl group of 8 to 36 carbon atoms contained within the pigment dispersing resin, relative to the total mass of all the structural units of the pigment dispersing resin (copolymer), is preferably within a range from 5% by mass to 60% by mass, more preferably from 10% by mass to 55% by mass, and particularly preferably from 20% by mass to 50% by mass.

In one embodiment, it is particularly desirable that an aromatic group is introduced into the pigment dispersing resin. An aromatic group can improve the adsorption capability to the pigment, and enable a rapid reduction in the pigment dispersibility upon mixing with the treatment liquid. This is because when the treatment liquid and the inkjet ink are mixed, powerful intermolecular forces called cation-π interactions occur between the calcium ions contained in the treatment liquid and the pigment dispersing resin having the aromatic group, causing the two to undergo preferential adsorption. Examples of the aromatic group include a phenyl group, naphthyl group, anthryl group, tolyl group, xylyl group, mesityl group and anisyl group. Of these, a phenyl group or tolyl group is preferred in terms of ensuring satisfactory dispersion stability.

From the viewpoint of achieving a combination of good pigment dispersion stability and favorable adsorption performance with the treatment liquid, the amount of the structural unit derived from the monomer containing the aromatic group, relative to the total mass of all of the structural units of the pigment dispersing resin, is preferably within a range from 5 to 65% by mass, and more preferably from 10 to 50% by mass.

In one embodiment, the acid value of the pigment dispersing resin is preferably within a range from 30 to 300 mgKOH/g. Adjusting the acid value to a value within this range satisfactorily enhances the reduction effect on the dispersion function upon mixing with the calcium ions in the treatment liquid, enabling images of extremely high image quality to be obtained with ease. Further, the ink stability improves, meaning a dispersed state similar to that initially obtained can be maintained even after storage of the ink for long periods, and aggregation and coverage properties similar to those initially obtained can be achieved with ease. Moreover, the solubility of the pigment dispersing resin in water can be ensured, and the viscosity of the pigment dispersion can be kept low. The acid value of the pigment dispersing resin is more preferably from 100 to 300 mgKOH/g, and an ink containing a pigment dispersing resin having an acid value within this range exhibits favorable printed matter coverage even during high-speed printing.

The acid value can be measured by a potentiometric titration method using a conventional device, such as the automatic potentiometric titrator AT-610 manufactured by Kyoto Electronics Manufacturing Co., Ltd.

In one embodiment, the weight average molecular weight of the pigment dispersing resin is preferably at least 1,000 but not more than 100,000. When the weight average molecular weight falls within the above range, the pigment can be more easily dispersed stably in water, and the viscosity of the ink can be more easily adjusted. Further, when the weight average molecular weight is at least 1,000, detachment of the pigment dispersing resin adsorbed to the pigment or coating the pigment can be prevented, meaning the dispersion stability can be favorably maintained. When the weight average molecular weight is not more than 100,000, the viscosity upon dispersion can be kept within a favorable range, any deterioration in the jetting stability from the inkjet head is prevented, and an ink having favorable printing stability can be more easily obtained.

In one embodiment, the pigment dispersing resin is preferably a water-soluble pigment dispersing resin. The weight average molecular weight of this water-soluble pigment dispersing resin is more preferably at least 10,000 but not more than 40,000. When the molecular weight falls within this range, ink thickening occurs upon insolubilization by the calcium ions. As a result, even during high-speed printing, color mixing is suppressed, images of high image quality can be obtained, and the continuous jetting stability during high-speed printing can be favorably maintained.

In one embodiment, the above method (1) is selected as the method for stably dispersing the pigment in the ink and maintaining that dispersion. In other words, when a water-soluble pigment dispersing resin is used as the above pigment dispersing resin, in order to increase the solubility of the resin in the ink, the acid groups in the pigment dispersing resin are preferably neutralized with a base. On the other hand, if an excess of base is introduced to effect the neutralization, then the calcium ions contained in the treatment liquid are also neutralized, making it difficult to achieve satisfactory effects, and therefore considerable care must be taken with the amount added of the base.

Whether or not the amount added of the base is excessive can be confirmed, for example, by preparing a 10% by mass aqueous solution of the water-soluble pigment dispersing resin and then measuring the pH of the aqueous solution. In one embodiment, from the viewpoint of ensuring satisfactory manifestation of the functions of the treatment liquid, the pH of the above aqueous solution is preferably within a range from 7 to 11, and more preferably from 7.5 to 10.5.

In one embodiment, examples of bases that may be used for neutralizing the water-soluble pigment dispersing resin include alkanolamines such as diethanolamine, triethanolamine and N-methyldiethanolamine; ammonia water; alkali metal hydroxides such as lithium hydroxide, sodium hydroxide and potassium hydroxide; and alkali metal carbonates such as lithium carbonate, sodium carbonate, sodium hydrogen carbonate and potassium carbonate.

In those cases where the above method (1) is selected, the blend amount of the water-soluble pigment dispersing resin relative to the pigment is preferably within a range from 1 to 50% by mass. Ensuring that the blend amount of the water-soluble pigment dispersing resin is from 1 to 50% by mass relative to the pigment suppresses any viscosity increase of the pigment dispersion, can easily improve the viscosity stability and dispersion stability of the pigment dispersion and the inkjet ink, and ensures a rapid reduction in the dispersion function upon mixing with the treatment liquid. The blend amount (ratio) of the water-soluble pigment dispersing resin relative to the pigment is more preferably within a range from 2 to 45% by mass, even more preferably from 4 to 40% by mass, and most preferably from 5 to 35% by mass.

<Water-Soluble Organic Solvent>

In one embodiment, the inkjet ink contains water and a water-soluble organic solvent as the liquid components. The ink preferably includes a specific alkyl diol (A) described below as the water-soluble organic solvent.

<Alkyl Diol (A) of 2 to 8 Carbon Atoms>

In one embodiment, the inkjet ink contains an alkyl diol (A) of 2 to 8 carbon atoms as a water-soluble organic solvent. As described above, it is thought that the alkyl diol (A) of 2 to 8 carbon atoms exhibits structural affinity with the acetylenediol-based surfactant, and enables excellent printed image quality to be achieved continuously regardless of the printing conditions or printing speed. Further, the hydroxyl groups that exist within the alkyl diol (A) of 2 to 8 carbon atoms generate electrostatic repulsion relative to the nitrate ions that exist in the treatment liquid layer, meaning the ink does not penetrate into the interior of the recording medium, but rather spreads uniformly across the surface of the recording medium, enabling the production of printed matter having high image density. Moreover, when an alkyl diol (A) of 2 to 8 carbon atoms is used as a solvent, it is thought that because there is no deterioration in the solubility or diffusion of the calcium ions, color mixing can be suppressed, and printing of high-image quality can be achieved. In this description, an alkanediol is sometimes referred to as an alkyl diol.

Although there are no particular limitations, specific examples of alkyl diols (alkanediols) (A) of 2 to 8 carbon atoms that can be used favorably include 1,2-ethanediol (ethylene glycol), 1,2-propanediol (propylene glycol), 1,3-propanediol, 1,2-butanediol, 1,3-butanediol, 1,4-butanediol, 1,2-pentanediol, 1,5-pentanediol, 1,2-hexanediol, 1,6-hexanediol, 1,2-heptanediol, 2,2-dimethyl-1,3-propanediol, 2-methyl-1,3-propanediol, 2-ethyl-2-methyl-1,3-propanediol, 3-methyl-1,3-butanediol, 3-methyl-1,5-pentanediol, 2-methyl-2-propyl-1,3-propanediol, 2-methylpentan-2,4-diol (hexylene glycol), and 2-ethyl-1,3-hexanediol. One of the above alkyl diols (A) of 2 to 8 carbon atoms may be used alone, or a combination of two or more such compounds may be used.

In terms of enabling excellent moisture retention and drying properties to be obtained, and enabling satisfactory coverage and high density to be achieved even during high-speed printing, a solvent of 3 to 6 carbon atoms is preferably selected from among the solvents listed above. Specific examples include 1,2-propanediol, 1,3-propanediol, 1,2-butanediol, 1,3-butanediol, 1,2-pentanediol, 1,5-pentanediol, 1,2-hexanediol and 1,6-hexanediol.

Moreover, a 1,2-alkyl diol in which the hydroxyl groups exist close to one another is preferably selected. The 1,2-alkyl diols mentioned above themselves function like surfactants, preventing liquid droplet coalescence on the treatment liquid layer and contributing to the wet spreadability, and are consequently preferred. In other words, in one embodiment, of the specific examples mentioned above, selection of one or more compounds selected from the group consisting of 1,2-propanediol, 1,2-butanediol, 1,2-penatnediol and 1,2-hexanediol is particularly desirable.

In one embodiment, from the viewpoint of obtaining high-density printed matter while maintaining favorable aggregation, the total amount of the alkyl diol (A) of 2 to 8 carbon atoms in the inkjet ink is preferably at least 6% by mass but not more than 40% by mass relative to the total mass of the inkjet ink.

(Other Water-Soluble Organic Solvents)

In one embodiment, from the viewpoints of improving the coverage during high-speed printing and achieving superior jetting stability, the inkjet ink preferably also contains, as another water-soluble organic solvent, a water-soluble organic solvent other than the alkyl diol (A) of 2 to 8 carbon atoms.

The water-soluble organic solvent other than the alkyl diol (A) of 2 to 8 carbon atoms is preferably a glycol ether-based solvent and/or an alkyl polyol-based solvent having a boiling point at one atmosphere of at least 180° C. but not more than 300° C. By also including another water-soluble organic solvent that satisfies this boiling point range, the wetting properties and drying properties of the inkjet ink can be controlled within favorable ranges, and favorable jetting stability can be achieved even during high-speed printing. Moreover, when combined with the treatment liquid described above, image defects such as color mixing can be prevented, and satisfactory coverage can be obtained.

The boiling point at one atmosphere described in the present description can be measured using a thermal analyzer such as a DSC (differential scanning calorimeter).

In one embodiment, in cases where the alkyl diol (A) of 2 to 8 carbon atoms is combined with a glycol ether-based solvent and/or an alkyl polyol-based solvent having a boiling point at one atmosphere of at least 180° C. but not more than 300° C., the total amount of the solvents relative to the total mass of the inkjet ink is preferably at least 6% by mass but not more than 50% by mass. Furthermore, from the viewpoints of the jetting stability from the inkjet nozzles, and ensuring satisfactory wetting properties and drying properties when combined with the treatment liquid, the total amount of the above water-soluble organic solvents is more preferably at least 10% by mass but not more than 45% by mass, and even more preferably at least 15% by mass but not more than 40% by mass. When the total amount of water-soluble organic solvents is at least 6% by mass, the ink moisture retention is favorable, meaning good jetting stability can be ensured. Further, when the total amount of water-soluble organic solvents is not more than 50% by mass, the ink viscosity can easily be adjusted to a value within the preferred range, and any deterioration in jetting stability can be prevented.

In one embodiment, an arbitrary water-soluble organic solvent other than a glycol ether-based solvent and/or an alkyl polyol-based solvent having a boiling point at one atmosphere of at least 180° C. but not more than 300° C. may be used as another water-soluble organic solvent besides the alkyl diol (A) of 2 to 8 carbon atoms. Specific examples of solvents that may be used include the monohydric alcohols, trihydric alcohols, nitrogen-containing solvents and heterocyclic compounds listed above as examples of the water-soluble organic solvent that may be used in the treatment liquid. One of these arbitrary water-soluble organic solvents may be used alone, or a combination of two or more such solvents may be used.

In one embodiment, in the inkjet ink, from the viewpoints of achieving superior moisture retention, drying properties and wetting properties, the total amount of water-soluble organic solvents in the inkjet ink, relative to the total mass of the inkjet ink, is preferably at least 6% by mass but not more than 70% by mass, more preferably at least 10% by mass but not more than 60% by mass, and particularly preferably at least 15% by mass but not more than 50% by mass.

(Boiling Points of Water-Soluble Organic Solvents)

In one embodiment, the amount of water-soluble organic solvents having a boiling point at one atmosphere of at least 240° C. in the inkjet ink is preferably at least 0% by mass but less than 10% by mass relative to the total mass of the inkjet ink. By controlling the amount of such organic solvents within the above range, the drying properties can be enhanced to the level where strike-through (blocking) does not occur, even during high-speed printing. Further, the amount of water-soluble organic solvent having a boiling point at one atmosphere of at least 240° C. is particularly preferably at least 0% by mass but less than 9.5% by mass relative to the total mass of the inkjet ink. In such cases, the combination with the treatment liquid enables images of excellent image quality to be obtained easily, even during high-speed printing. The term "0% by mass" means the case in which the ink does not contain any water-soluble organic solvents having a boiling point at one atmosphere of at least 240° C. Further, the amount of water-soluble organic solvents having a boiling point at one atmosphere of at least 240° C. is calculated so as to include the alkyl diol (A) of 2 to 8 carbon atoms.

In one embodiment, from the viewpoint of the long-term jetting stability during high-speed printing, the amount of water-soluble organic solvents having a boiling point at one atmosphere of at least 120° C. in the inkjet ink is preferably at least 17% by mass but not more than 70% by mass relative to the total mass of the inkjet ink. This amount of water-soluble organic solvents having a boiling point at one atmosphere of at least 120° C. is calculated so as to include the alkyl diol (A) of 2 to 8 carbon atoms.

In one embodiment, the weighted average boiling point at one atmosphere of the water-soluble organic solvents contained in the inkjet ink is preferably within a range from 175 to 240° C. This weighted average boiling point is more preferably from 180 to 230° C., even more preferably from 185 to 220° C., and particularly preferably from 190 to 210° C.

When the weighted average boiling point of the water-soluble organic solvents falls within this range, the combination with the treatment liquid of the embodiment described above enables images of high image quality to be obtained easily, even during high-speed printing, and enables superior jetting stability to be more easily obtained. The weighted average boiling point is calculated including the alkyl diol (A) of 2 to 8 carbon atoms. The "weighted average boiling point at one atmosphere" is a value obtained by calculating, for each water-soluble organic solvent, a multiplication value of the boiling point at one atmosphere and the mass ratio of a water-soluble organic solvent relative to the total mass of all of the water-soluble organic solvents, and then adding together the calculated multiplication values for the various water-soluble organic solvents.

<Binder Resin>

In one embodiment, the inkjet ink may also include a binder resin if necessary. Generally known binder resins include resin microparticles and water-soluble resins, and either one may be used alone, or a combination of both may be used.

The aforementioned resin microparticles tend to have a higher molecular weight than water-soluble resins, and can also lower the viscosity of the inkjet ink, meaning a larger amount of the resin can be added to the inkjet ink, which is ideal for dramatically enhancing the coating film durability of the printed matter. Examples of resins that may be used for the resin microparticles include acrylic-based resins, styrene-acrylic-based resins, urethane-based resins, styrene-butadiene-based resins, vinyl chloride-based resins, and polyolefin-based resins. In the same manner as mentioned above, methacrylic resins may also be used for the acrylic resins. Among these resins, if consideration is given to the stability of the ink and the durability of the printed matter, then acrylic-based or styrene-acrylic-based resin microparticles can be used particularly favorably.

When the binder resin contained in the inkjet ink is composed of resin microparticles, consideration must be given to the MFT of the resin microparticles. When resin microparticles having a low MFT are used, the variety of water-soluble organic solvent added to the inkjet ink can sometimes cause further reduction in the MFT of the resin microparticles, meaning fusion and aggregation of the resin microparticles may occur even at room temperature, and as a result, blockages of the inkjet head nozzles can sometimes occur. In order to avoid these problems, it is preferable that the MFT of the resin microparticles is set to 60° C. or higher by appropriate adjustment of the monomers that constitute the resin microparticles.

The above MFT can be measured using MFT Tester manufactured by Tester Sangyo Co., Ltd. Specifically, a 25% by mass aqueous solution of the resin microparticles is applied to a film to form a wet film thickness of 300 μm. Subsequently, the thus obtained coated product is placed on the above tester with a temperature gradient applied. Following drying of the coated product, the temperature at the boundary between the region where whitening has occurred and a uniform film has not been not obtained and the region where a transparent resin film has formed is deemed the MFT.

When the binder resin is composed of resin microparticles, in one embodiment, the acid value of the resin microparticles is preferably within a range from 0 to 80 mgKOH/g, more preferably from 10 to 50 mgKOH/g, and particularly preferably from 20 to 50 mgKOH/g. When the acid value falls within this range, the coating film durability of the printed matter can be easily improved, and the dispersed state within the inkjet ink can be favorably maintained, meaning an ink having excellent storage stability can be more easily obtained.

On the other hand, when a water-soluble resin is used as the binder resin, the type of fusion and aggregation of the resin microparticles observed with the above resin microparticles does not occur. Accordingly, in those cases where the maintenance properties of the inkjet printer take precedence, selection of a water-soluble resin is preferred. In those cases where a water-soluble resin is selected, the weight average molecular weight of the water-soluble resin is preferably at least 8,000 but not more than 50,000, and more preferably at least 10,000 but not more than 40,000. By ensuring that the weight average molecular weight is at least 10,000, favorable coating film durability can be more easily obtained for the printed matter. On the other hand, by ensuring that the weight average molecular weight is not more than 50,000, an inkjet ink having superior jetting stability from the inkjet head and superior maintenance properties can be more easily obtained.

Further, even when a water-soluble resin is selected as the binder resin, the acid value of the resin is important. The acid value of the water-soluble resin is preferably within a range from 10 to 80 mgKOH/g, and an acid value of 20 to 50 mgKOH/g is more desirable. When the acid value is at least 10 mgKOH/g, the redissolvability of the inkjet ink when the ink solidifies improves, and any deterioration in printing stability caused by blockages of the inkjet head nozzles can be easily prevented. Further, an acid value of not more than 80 mgKOH/g is preferred in terms of enabling the water resistance of the printed matter to be improved, while not impairing the aggregation function provided by the calcium nitrate contained in the treatment liquid of the embodiment described above. In one embodiment, the acid value of the water-soluble resin is more preferably 50 mgKOH/g or less.

In one embodiment, in those cases where a binder resin is used in the inkjet ink, the binder resin preferably includes at least one resin selected from among acrylic resins, styrene-acrylic resins and polyolefin resins. In the same manner as mentioned above, methacrylic resins may also be used for the acrylic resins. Although the reasons remain unclear, the resins listed above exhibit favorable compatibility when mixed with calcium nitrate, and do not suffer whitening of the coating film upon drying to form a coating film, and are consequently preferred in terms of obtaining printed matter having satisfactory density.

In one embodiment, in those cases where a binder resin is used in the inkjet ink, the amount of the binder resin, expressed as a solid fraction amount relative to the total mass of the inkjet ink, is preferably at least 1% by mass but not more than 20% by mass, more preferably at least 2% by mass but not more than 15% by mass, and particularly preferably at least 3% by mass but not more than 10% by mass.

<Surfactants>
<Acetylenediol-Based Surfactant>

In one embodiment, the inkjet ink contains an acetylenediol-based surfactant as a surfactant. Acetylenediol-based surfactants can orient at the surface in a very short period of time, thereby lowering the surface tension. Accordingly, even if the heat absorption that occurs upon dissociation of the calcium nitrate causes slight changes in the ink viscosity or surface tension, this has no effect on the speed of orientation at the surface of the ink droplets or the rate of wet spreading of the ink droplets. Further, it is also thought that because rapid orientation with the ink droplets occurs, coalescence of the ink droplets can be suppressed. Moreover, acetylenediol-based surfactants have good structural affinity with the alkyl diol (A) of 2 to 8 carbon atoms, and can therefore exist uniformly and stably within the ink. In addition, it is thought that acetylenediol-based surfactants electrostatically repel the nitrate ions that exist in the treatment liquid layer, allowing the ink droplets to spread uniformly across the surface of the recording medium. As a result of the above properties, it is thought that the acetylenediol-based surfactant suppresses color mixing and improves coverage during high-speed printing, and contributes to higher density, thus enabling printing of high image quality.

In the present invention, a single acetylenediol-based surfactant may be used alone, or a combination of two or more acetylenediol-based surfactants may be used. Further, acetylenediol-based surfactants synthesized by conventional methods may be used, or commercially available products may be used.

In one embodiment, the inkjet ink preferably contains a compound represented by the above general formula (1) as the acetylenediol-based surfactant. Among these, compounds of general formula (1) in which s represents 1 or 2 and t+u is from 0 to 4 are preferred, and compounds in which s represents 1 or 2 and t+u is 0 are the most desirable. These compounds exhibit an extremely rapid speed of orientation at the air-liquid interface. Further, they also exhibit excellent affinity with the treatment liquid of the present invention containing a compound represented by general formula (1). As a result of these factors, the wetting properties of the inkjet ink can be improved, and printed matter of high image quality with good suppression of bleeding and voids can be obtained with ease.

<Other Surfactants>

In one embodiment, in addition to the acetylenediol-based surfactant, the inkjet ink may also contain another surfactant besides the acetylenediol-based surfactant (hereafter simply referred to as the "other surfactant"). However, this other surfactant is added at a level that does not impair the aggregation performance of the treatment liquid containing calcium nitrate, and does not impair the coverage and density improvement effects obtained as a result of the combination of the alkyl diol (A) of 2 to 8 carbon atoms and the acetylenediol-based surfactant. A single other surfactant may be used alone, or a combination of two or more such other surfactants may be used.

From the viewpoints of ensuring optimal wetting properties and achieving stable jetting from the inkjet nozzles, the use of a siloxane-based surfactant and/or fluorine-based surfactant as the other surfactant is preferred, and the use of a siloxane-based surfactant is particularly desirable. The amount added of the other surfactant, relative to the total mass of the inkjet ink, is preferably at least 0.01% by mass but not more than 5.0% by mass, and is more preferably at least 0.05% by mass but not more than 3.0% by mass.

Further, the molecular weight of the surfactant is also important in terms of controlling the wettability during evaporation of the inkjet ink, and improving the quality of the printed matter such as the coating film durability and the solvent resistance. The weight average molecular weight of the surfactant is preferably at least 1,000 but not more than 7,000, and more preferably at least 1,500 but not more than 5,000. When the molecular weight of the surfactant is at least 1,000, the control effect on the wettability of the recording medium is more easily enhanced. Further, when the molecular weight of the surfactant is not more than 7,000, an inkjet ink having excellent storage stability can be more easily obtained.

The other surfactant may be synthesized using conventional methods, or a commercially available product may be used. When a commercially available surfactant is used, siloxane-based surfactants may be selected from among the specific examples of surfactants described above for use in the treatment liquid. Further, specific examples of fluorine-based surfactants include Zonyl TBS, FSP, FSA, FSN-100, FSN, FSO-100, FSO, FS-300, Capstone FS-30 and FS-31 (manufactured by E. I. du Pont de Nemours and Company), and PF-151N and PF-154N (manufactured by Omnova Solutions Inc.).

The surfactant used in the inkjet ink and the surfactant used in the treatment liquid may be the same or different. If mutually different surfactants are used, then as described above, the blend amounts are preferably determined with due care regarding the surface tensions of the surfactants.

<Water>

The inkjet ink of the embodiment described above contains water. The water included in the inkjet ink is preferably not a typical water containing various ions, and the use of an ion-exchanged water (deionized water) is preferred.

In one embodiment, the amount of water in the inkjet ink is preferably within a range from 20 to 90% by mass relative to the total mass of the ink.

<Other Components>

In one embodiment, in addition to the components described above, the inkjet ink may contain appropriate amounts of other additives such as pH adjusters, antifoaming agents, preservatives, infrared absorbers and ultraviolet absorbers in order to obtain an ink having certain desired physical property values. The blend amount of these additives is preferably at least 0.01% by mass but not more than 10% by mass relative to the total mass of the inkjet ink. For the pH adjuster, the materials mentioned above for use as the pH adjuster in the treatment liquid can be used favorably.

In one embodiment, it is preferable that the inkjet ink contains substantially no polymerizable monomers. Here, the expression "contains substantially no polymerizable monomers" means that no such monomers are added intentionally, but does not exclude the incorporation or generation of trace amounts of such monomers during production or storage of the inkjet ink. Specifically, the amount of polymerizable monomers relative to the total mass of the inkjet ink is preferably not more than 1% by mass, and even more preferably 0.5% by mass or less.

<Inkjet Ink Set>

In one embodiment, an inkjet ink of a single color may be used. In another embodiment, depending on the application, the inkjet inks may be used in the form of an inkjet ink set containing a combination of a plurality of colors. There are no particular limitations on the color combination, but full-color images can be obtained by using the three colors of cyan, yellow and magenta. Further, by also adding a black ink, the level of blackness can be improved, and the legibility of text and the like can be improved. Moreover, by also adding other colors such as orange and green, the color reproducibility can be improved. When printing is performed to recording media that is not white, including a white ink enables more distinct images to be obtained. In those cases where the inkjet inks include a magenta ink, as mentioned above, it is preferable that the magenta ink contains at least one pigment selected from among C.I. Pigment Red 150, 185 and C.I. Pigment Violet 19 as the magenta pigment.

<Method for Producing Inkjet Ink>

The inkjet ink is composed of the types of components described above, and can be produced, for example, using the processes described below. However, the method for producing the inkjet ink is not limited to the processes described below.

(1) Production of Pigment Dispersion (when a Water-Soluble Pigment Dispersing Resin is Used)

In those cases where a water-soluble pigment dispersing resin is used in the inkjet ink, a pigment dispersion is prepared prior to preparation of the ink. For example, the pigment is added to a mixed solution prepared by mixing the water-soluble pigment dispersing resin and water, and following mixing and stirring, a dispersion treatment is performed using a dispersion device. Subsequently, a centrifugal separation or filtration may be performed as required to obtain a pigment dispersion.

Performing premixing prior to the dispersion treatment is effective. The premixing may be performed by adding the pigment to a mixed solution prepared by mixing at least the pigment dispersing resin and water. This type of premixing operation improves the wettability of the pigment surface and can accelerate the adsorption of the dispersant to the pigment surface, and is consequently preferred.

The dispersion device used for the pigment dispersion treatment may be any typically used dispersion device. Examples include a ball mill, roll mill, sand mill, beads mill, nanomizer, paint shaker and microfluidizer. Among these, a beads mill can be used particularly favorably. Specific examples include beads mills available commercially with product names such as Supermill, Sand Grinder, Agitator Mill, Glen Mill, Dyno-Mill, Pearl Mill and CoBall Mill.

During the premixing and the dispersion treatment for the pigment, the water-soluble pigment dispersing resin may be mixed only with water, or may be mixed with a mixed solvent containing an organic solvent and water.

Examples of methods for controlling the particle size distribution of the pigment contained in the pigment dispersion include reducing the size of the grinding media in the aforementioned dispersion device, altering the material used for the grinding media, increasing the grinding media filling ratio, altering the shape of the stirring member (agitator), lengthening the dispersion treatment time, performing classification with a filter or a centrifugal separator or the like after the dispersion treatment, or a combination of these methods. In one embodiment, from the viewpoint of ensuring that the pigment size falls within the preferred particle size range, the diameter of the grinding media in the above dispersion device is preferably within a range from 0.1 to 3 mm. Further, examples of materials that can be used favorably as the grinding media include glass, zircon, zirconia and titania.

(2) Preparation of Inkjet Ink

In those cases where a pigment dispersing resin is used in the inkjet ink, the ink can be obtained, for example, by adding the water-soluble organic solvent, the surfactant and water, and where necessary the binder resin and other additives described above, to the pigment dispersion produced in the manner described above, and then performing stirring and mixing.

In the ink preparation, if necessary, the mixture of the above components may be stirred and mixed while being heated at a temperature within a range from 40 to 100° C. However, when resin microparticles are used as the binder resin, the heating temperature is preferably not higher than the MFT of the resin microparticles.

(3) Removal of Coarse Particles

In one embodiment, coarse particles contained in the above mixture obtained during ink preparation are preferably removed using techniques such as filtration separation and centrifugal separation, thus obtaining the inkjet ink. Conventional methods may be used as appropriate for the filtration separation method. Further, there are no particular limitations on the filter pore size, provided coarse particles and dust can be removed. For example, the filter pore size is preferably within a range from 0.3 to 5 μm, and more preferably from 0.5 to 3 μm. Further, when filtration is performed, a single type of filter may be used alone, or a combination of a plurality of filter types may be used.

<Properties of Inkjet Ink>

In one embodiment, the viscosity of the inkjet ink at 25° C. is preferably adjusted to value within a range from 3 to 20 mPa·s. Provided the ink has a viscosity within this range, stable jetting characteristics can be obtained from heads having a typical frequency of 4 to 10 kHz through to heads having a high frequency of 10 to 70 kHz. In particular, by ensuring that the viscosity at 25° C. is within a range from 3 to 14 mPa·s, stable jetting can be achieved even when using an inkjet head having a design resolution of 600 dpi or higher.

The viscosity of the inkjet ink at 25° C. can be measured using normal methods. Specifically, the viscosity can be measured with an E-type viscometer (TVE25L viscometer, manufactured by Toki Sangyo Co., Ltd.), and represents the value obtained by measuring the viscosity of 1 mL of the ink at 25° C.

In one embodiment, from the viewpoint of obtaining printed matter having excellent color development, the inkjet ink preferably contains a pigment having an average secondary particle size (D50) of 40 nm to 500 nm, more preferably 50 nm to 400 nm, and particularly preferably 60 nm to 300 nm. In order to ensure that the average secondary particle size of the pigment falls within the above preferred range, the pigment dispersion treatment process is preferably controlled in the manner described above. The average secondary particle size represents, for example, the median size measured by the dynamic light scattering method. Specifically, the average secondary particle size may be a value obtained by measuring the ink, which may be diluted with water as necessary, using a Nanotrac UPA-EX150 manufactured by MicrotracBEL Corporation.

2. Method for Producing Printed Matter

One embodiment relates to a method for producing printed matter using an ink set containing the treatment liquid of an embodiment described above and the inkjet ink of an embodiment described above. The production method preferably incudes a step of applying the treatment liquid of an embodiment described above to a recording medium formed from a paper substrate or a synthetic paper substrate, and a step of applying the inkjet ink of an embodiment described above by one-pass printing to a portion to which the treatment liquid has been applied.

"One-pass printing" is a printing method in which either the inkjet head is scanned only once across a stationary recording medium, or the recording medium is passed only once beneath a stationary inkjet head, meaning no ink is overprinted on top of previously printed ink. One-pass printing requires fewer scanning repetitions and enables increased printing speeds compared with conventional inkjet printing methods that require multiple scanning passes of the inkjet head (multi-pass printing methods). As a result, one-pass printing can be used favorably for industrial applications that require fast printing speeds. It could be said that use of this printing method is essential for realizing the type of inkjet printing that has recently been actively investigated as an alternative to offset printing and gravure printing.

The method for producing printed matter using an ink set of the embodiment described above is described below in further detail.

<Method for Applying Treatment Liquid>

In one embodiment, prior to printing of the inkjet ink, the treatment liquid is applied to a recording medium being transported at a speed of at least 40 m/min. The method for applying the treatment liquid to the recording medium may employ either a printing method that involves no contact with the recording medium such as inkjet printing, or a printing method that involves bringing the treatment liquid into contact with the recording medium.

In recent years, by employing a heater inside the head, and by optimizing the flow channels in the head and the nozzle structures, inkjet heads have been developed that are capable of jetting even liquid compositions having a viscosity at 25° C. of about 100 mPa·s. In one embodiment, the preferred range for the viscosity at 25° C. of the above treatment liquid is from 5 to 100 mPa·s, meaning the treatment liquid can be printed without any problems, even when inkjet printing is employed. In those cases where inkjet printing is employed as the method for applying the treatment liquid, from the viewpoint of retaining the inherent texture of the recording medium in the unprinted portions, the treatment liquid is preferably only applied to those portions to which the inkjet ink is to be applied.

On the other hand, from the viewpoints of preventing damage to the members that constitute the inkjet head, and ensuring favorable inkjet printability, a printing method in which the treatment liquid is brought into contact with the recording medium is preferably used. Any conventional method may be selected as the printing method for bringing the treatment liquid into contact with the recording medium. For example, from the viewpoints of apparatus simplicity, coating uniformity, operational efficiency, and economic viability and the like, a roller-type method is preferred employed. Here, a "roller-type method" means a printing method in which the treatment liquid is first applied to a rotating roller, and that treatment liquid is then transferred to the recording medium. Examples of roller-type coating devices that can be used favorably include offset gravure coaters, gravure coaters, doctor coaters, bar coaters, blade coaters, flexo coaters and roll coaters.

In one embodiment, the coating film thickness of the treatment liquid on the recording medium, expressed as a wet thickness, is preferably within a range from 0.5 to 10 µm, more preferably from 0.5 to 8.5 µm, and particularly preferably from 0.6 to 6 µm. When the coating film thickness is adjusted to a value within this range, the inherent texture of the recording medium is not impaired in those portions where the treatment liquid is applied but the inkjet ink is not applied, a satisfactory color mixing suppression effect can be achieved even during high-speed printing, and drying of the solvent components in the treatment liquid can be conducted satisfactorily. The coating film thickness of the treatment liquid is preferably determined with due consideration of the amount of inkjet ink applied and the amount of residual treatment liquid on the recording medium.

<Thermal Energy Application Following Treatment Liquid Application>

In one embodiment, following application of the treatment liquid to the recording medium, but prior to application of the inkjet ink, thermal energy is preferably applied to the recording medium to dry the treatment liquid on the recording medium. Further, it is particularly preferable that the treatment liquid is dried completely, namely that the liquid components of the treatment liquid are completely removed, before application of the inkjet ink. If the inkjet ink is applied before the treatment liquid has completely dried, then the reduction in the dissolution and/or dispersion action on the solid components in the inkjet ink can be better promoted. However, on the other hand, the amount of liquid components on the recording medium may become excessive, and if the amount of thermal energy applied following inkjet printing is insufficient, then there is a possibility that waviness of the recording medium or image defects such as bleeding may occur.

There are no particular limitations on the method used for applying the thermal energy. Examples of methods that may be used include heating drying methods, hot air drying methods, infrared drying methods, microwave drying methods and drum drying methods. The above drying methods may be used individually, or a plurality of methods may be combined. For example, by using a combination of a heating drying method and a hot air drying method, the treatment liquid can be dried more rapidly than when either of these methods is used alone.

From the viewpoints of preventing damage to the recording medium and preventing sudden boiling of the liquid components in the treatment liquid, in those cases where a heating drying method is employed, the drying temperature is preferably within a range from 35 to 100° C. Further, in those cases where a hot air drying method is employed, the temperature of the hot air is preferably from 50 to 250° C. Further, for similar reasons, in those cases where an infrared drying method is employed, at least 50% of the integrated value of the total output of infrared rays used in the infrared irradiation preferably exists in the wavelength region from at least 700 nm to not more than 1,500 nm.

<Treatment Liquid Application and Drying Device>

A device for implementing application and drying of the treatment liquid in the above production method is installed in either an in-line arrangement or an off-line arrangement relative to the inkjet printing apparatus described below. In terms of convenience during printing, installation of the device in an in-line arrangement is preferred.

<Method for Applying Inkjet Ink>

As described above, the inkjet ink is preferably applied to the recording medium using a one-pass printing method. As already mentioned above, there are two types of one-pass printing: a method in which the inkjet head is scanned only once across a stationary recording medium, and a method in which the recording medium is passed only once beneath a stationary inkjet head. In the case of the method in which the inkjet head is scanned, the jet timing must be adjusted in accordance with the movement of the inkjet head, and there is an increased likelihood of variation in the impact position. As a result, in one embodiment, a method in which the inkjet head is kept stationary and the recording medium is scanned can be used favorably. In this method, the transport speed of the recording medium is preferably at least 40 m/min. Particularly in those cases where the treatment liquid application device is installed in an in-line arrangement relative to the inkjet printing apparatus, it is preferable that the treatment liquid application device and the inkjet printing apparatus are disposed in a continuous arrangement, so that the recording medium to which the treatment liquid has been applied can be simply transported to the inkjet printing section.

Further, as already mentioned above, by using the ink set of the embodiment described above, images of high image quality can be produced even at high speed and even with a recording resolution of 600 dpi or higher. Of the various possibilities, from the viewpoint of being able to provide printed matter having image quality similar to that achievable with offset printing or gravure printing, in one embodiment, it is particularly preferable that the recording resolution of the printed matter is 1,200 dpi or higher.

<Inkjet Head>

In those cases where a method in which the recording medium is passed only once beneath a stationary inkjet head is employed as the one-pass printing method, the recording resolution in the recording width direction is determined by the design resolution of the inkjet head. In a similar manner to that mentioned above, the recording resolution in the recording width direction is also preferably 600 dpi or higher. Accordingly, the design resolution of the inkjet head is also preferably 600 dpi or higher, and is particularly preferably 1,200 dpi or higher Provided the design resolution of the inkjet head is 600 dpi or higher, printing of one color can be performed with a single inkjet head, which is preferable from the viewpoint of reducing the size of the apparatus and from an economic viewpoint. On the other hand, in those cases where an inkjet head having a design resolution lower than 600 dpi is used, by aligning a plurality of inkjet heads along the transport direction for the recording medium for one color, a recording resolution of 600 dpi or higher in the recording width direction can still be achieved by one-pass printing.

Furthermore, the print resolution in the transport direction of the recording medium is dependent not only on the design resolution of the inkjet head, but also on the drive frequency of the inkjet head and the printing speed. For example, the recording resolution in the transport direction can be doubled by either reducing the printing speed by ½, or by doubling the drive frequency. In those cases where, as a result of the design of the inkjet head, a print resolution of 600 dpi or higher cannot be achieved in the transport direction when the printing speed is 40 m/min or higher, by aligning a plurality of inkjet heads along the transport direction for the recording medium for one color, a combination of the superior printing speed and print resolution can be achieved.

The drop volume for the inkjet ink in the inkjet one-pass printing method is significantly affected by the performance of the aforementioned inkjet head, but from the viewpoint of achieving high-quality images, the drop volume is preferably within a range from 1 to 30 pL. Furthermore, in order to obtain high-quality images, the use of an inkjet head with a graduated specification that enables the drop volume to be varied is particularly preferred.

<Thermal Energy Application following Inkjet Ink Application>

Following application of the inkjet ink to the recording medium to which the treatment liquid has already been applied, thermal energy is preferably applied to the recording medium to dry the inkjet ink and any undried treatment liquid. Examples of thermal energy application methods and conditions that can be used favorably include the same methods and conditions as those described above for the drying of the treatment liquid.

<Inkjet Ink Drying Device>

The inkjet ink drying device may be installed in an in-line arrangement or an off-line arrangement relative to the inkjet printing apparatus. In terms of convenience and the like during printing, the inkjet ink drying device is preferably installed in an in-line arrangement. In one embodiment, from the viewpoints of preventing bleeding, color irregularities, and curling and the like of the recording medium, the thermal energy is preferably applied within 30 seconds of printing the ink, more preferably within 20 seconds, and particularly preferably within 10 seconds.

<Amounts Applied of Treatment Liquid and Inkjet Ink>

In one embodiment, the ratio of the amount applied of the inkjet ink, relative to a value of 1 for the amount applied of the treatment liquid, is preferably at least 0.1 but not more than 10. This ratio of the amount applied of the ink is more preferably at least 0.5 but not more than 9, and particularly preferably at least 1 but not more than 8. By ensuring that the ratio of the amount applied of the ink falls within the above range, changes in the texture of the recording medium caused by excessive treatment liquid, and bleeding and color irregularities that can occur as a result of excessive inkjet ink and a deterioration in the effects of the treatment liquid can be suppressed, and high-quality printed matter can be obtained with ease.

<Printing Speed>

As mentioned above, in the method for producing printed matter using the ink set of the embodiment described above, the printing speed is preferably at least 40 m/min, more preferably at least 60 m/min, and particularly preferably 80 m/min or higher.

<Recording Medium>

In the method for producing printed matter described above, in order to achieve high-speed and high-image quality printing, the functions of the treatment liquid must be able to be satisfactorily realized. Consequently, the calcium nitrate in the treatment liquid must exist on the recording medium in an amount within a specific range. Accordingly, the state of formation of the treatment liquid layer on the recording medium during inkjet printing is important, meaning the porosity and permeability of the recording medium, which affect the formation of the treatment liquid layer, are important. When performing printing using the ink set of the embodiment described above, conventional recording media may be used as desired, but from the above viewpoints, a paper substrate or synthetic paper substrate is preferably selected as the recording medium.

The term "paper substrate" mentioned above means a recording medium obtained by subjecting a material containing pulp to a papermaking process. The papermaking process may involve single-layer papermaking or multi-layer papermaking. Further, the surface of the paper may have a coating layer. Specific examples of paper substrates include high-quality papers, recycled papers, finely coated papers, coated papers, art papers, cast papers, liner papers, manila cardboards, and coated cardboards. The aforementioned "synthetic paper substrates" are recording media that contain a synthetic resin as the main raw material, and are recording media that have similar printing process characteristics to paper substrates.

The ink set of the embodiment described above can also be used on a variety of other substrates besides the recording media described above, including various fabric substrates of cotton or silk or the like, and plastic substrates such as polyvinyl chloride sheets, PET films, polypropylene films and polyethylene films.

The recording medium may have a surface that is either smooth or uneven. Further, the substrate may be transparent, semi-transparent or opaque. Furthermore, a substrate obtained by bonding together two or more print media may also be used. Moreover, a releasable adhesive layer may be provided on the opposite side from the printing surface, or an adhesive layer or the like may be provided on the printed surface following printing. The recording medium may exist in a roll-type form or sheet-like form.

The amount of calcium ions derived from the treatment liquid on the recording medium surface is preferably within a range from 0.5 to 5 mmol/m$^2$, and more preferably from 1 to 4 mmol/m$^2$. When the amount of calcium ions falls within this range, the aggregation and coverage properties due to the calcium ions are favorable, and images of high image quality can be obtained with ease.

EXAMPLES

The present invention is described below in further detail using a series of examples and comparative examples. In the following description, unless particularly stated otherwise, "parts" and "%" mean "parts by mass" and "% by mass" respectively.

I. Preparation of Treatment Liquids (1) Preparation Example for PVA103 Varnish

The materials described below were mixed at room temperature for one hour under constant stirring, and the temperature was then raised to 90° C. and mixing was continued for a further one hour. Subsequently, the thus obtained mixture was cooled to room temperature to obtain a PVA103 varnish.

(Materials)
PVA103 (a polyvinyl alcohol manufactured by Kuraray Co., Ltd. (degree of saponification: 98 to 99% (fully saponified), degree of polymerization: 300)) 25 parts
Ion-exchanged water 75 parts (2) Preparation Example for Treatment Liquid 1

A mixing container equipped with a stirrer was prepared, and the materials listed below were added sequentially. The materials were mixed at room temperature for one hour under gentle stirring, and the temperature was then raised to 60° C. and mixing was continued for a further one hour. Subsequently, the thus obtained mixture was cooled to room temperature and filtered through a membrane filter having a pore size of 1 μm to obtain a treatment liquid 1.
(Materials)

| | |
|---|---|
| Calcium nitrate tetrahydrate (manufactured by Yoneyama Chemical Industry Co., Ltd.) | 10 parts |
| Triethanolamine (TEA) | 1 part |
| 35% hydrochloric acid (35% HCl) | 0.62 parts |
| PVA103 varnish | 20 parts |
| 2-propanol (iPrOH) | 4 parts |
| Dynol 607 (an acetylene-based surfactant manufactured by Air Products and Chemicals, Inc.) | 0.4 parts |
| PROXEL GXL (a preservative, a 1,2-benzisothiazol-3-one solution, manufactured by Arch Chemicals, Inc.) | 0.05 parts |
| Ion-exchanged water | 63.93 parts |

The viscosity of the obtained treatment liquid 1 at 25° C. was measured using an E-type viscometer (TVE25L viscometer, manufactured by Toki Sangyo Co., Ltd.). Further, the pH of the treatment liquid 1 at 25° C. was measured using a desktop pH meter (F-72 manufactured by Horiba, Ltd.) and a standard ToupH electrode. These results are shown in Table 1.

(3) Preparation Examples for Treatment Liquids 2 to 32

With the exception of using the materials shown in Table 1, the same method as that described for the treatment liquid 1 was used to obtain treatment liquids 2 to 32.

Further, the viscosity and pH of each treatment liquid was measured in the same manner as treatment liquid 1. The measurement results are shown in Table 1.

TABLE 1

| | | | Treatment liquid No. | | | | | | | |
|---|---|---|---|---|---|---|---|---|---|---|
| | | | 1 | 2 | 3 | 4 | 5 | 6 | 7 | 8 |
| Blend amount (%) | Metal salt | Ca(NO$_3$)$_2$•4H$_2$O | 10.0 | 11.0 | 20.0 | 28.0 | 30.0 | 20.0 | 20.0 | 20.0 |
| | | CaCl$_2$•2H$_2$O | | | | | | | | |
| | | NaCl | | | | | | | | |
| | pH adjuster | Base | TEA | 1.0 | 1.0 | 1.0 | 1.0 | 1.0 | | | |
| | | | NaOH | | | | | | | | |
| | | Acid | 35% HCl | 0.62 | 0.62 | 0.62 | 0.62 | 0.62 | 0.4 | 0.3 | |
| | | | CH$_3$COOH | | | | | | | | 1.0 |
| | | Other | CH$_3$COONa | | | | | | | | 0.25 |
| | Binder resin | | PVA103 varnish (solid fraction: 25%) | 20.0 | 20.0 | 20.0 | 20.0 | 20.0 | 20.0 | 20.0 | 20.0 |
| | | | BYK190 (solid fraction: 40%) | | | | | | | | |

TABLE 1-continued

|  |  |  | 1 | 2 | 3 | 4 | 5 | 6 | 7 | 8 |
|---|---|---|---|---|---|---|---|---|---|---|
| Organic solvent | Monohydric alcohol | iPrOH (boiling point: 82° C.) | 4.0 | 4.0 | 4.0 | 4.0 | 4.0 | 4.0 | 4.0 | 4.0 |
|  | Glycol | 1,2-PD (boiling point: 188° C.) |  |  |  |  |  |  |  |  |
|  |  | 1,2-HexD (boiling point: 224° C.) |  |  |  |  |  |  |  |  |
|  |  | DEG (boiling point: 244° C.) |  |  |  |  |  |  |  |  |
|  | Other | Glycerol (boiling point: 290° C.) |  |  |  |  |  |  |  |  |
| Surfactant |  | Dynol 607 | 0.4 | 0.4 | 0.4 | 0.4 | 0.4 | 0.4 | 0.4 | 0.4 |
| Preservative |  | PROXEL GXL | 0.05 | 0.05 | 0.05 | 0.05 | 0.05 | 0.05 | 0.05 | 0.05 |
| Water |  |  | 63.93 | 62.93 | 53.93 | 45.93 | 43.93 | 55.15 | 55.25 | 54.3 |
| Treatment liquid viscosity (mPa · s) |  |  | 8.0 | 8.2 | 8.5 | 8.8 | 9.0 | 8.0 | 8.1 | 8.2 |
| Treatment liquid pH |  |  | 6.6 | 6.5 | 6.2 | 5.8 | 5.5 | 2.2 | 3.1 | 3.6 |
| Calcium nitrate content (%) |  |  | 6.9 | 7.6 | 13.9 | 19.5 | 20.8 | 13.9 | 13.9 | 13.9 |
| Amount of organic solvent having boiling point of 240° C. or higher (%) |  |  | 0.0 | 0.0 | 0.0 | 0.0 | 0.0 | 0.0 | 0.0 | 0.0 |

| | | | Treatment liquid No. | | | | | | | |
|---|---|---|---|---|---|---|---|---|---|---|
| | | | 9 | 10 | 11 | 12 | 13 | 14 | 15 | 16 |
| Blend amount (%) | Metal salt | Ca(NO$_3$)$_2$·4H$_2$O | 20.0 | 20.0 | 20.0 | 20.0 | 20.0 | 20.0 | 20.0 | 20.0 |
|  |  | CaCl$_2$·2H$_2$O |  |  |  |  |  |  |  |  |
|  |  | NaCl |  |  |  |  |  |  |  |  |
|  | pH adjuster Base | TEA | 1.0 | 1.0 | 1.0 | 1.0 | 1.0 | 1.0 | 1.0 | 1.0 |
|  |  | NaOH |  |  |  |  |  |  |  |  |
|  | Acid | 35% HCl |  | 0.6 | 0.5 | 0.4 | 0.62 | 0.4 | 0.62 | 0.62 |
|  |  | CH$_3$COOH |  |  |  |  |  |  |  |  |
|  | Other | CH$_3$COONa |  |  |  |  |  |  |  |  |
|  | Binder resin | PVA103 varnish (solid fraction: 25%) | 20.0 | 20.0 | 20.0 | 20.0 | 20.0 | 20.0 | 20.0 | 20.0 |
|  |  | BYK190 (solid fraction: 40%) |  |  |  |  |  |  |  |  |
| Organic solvent | Monohydric alcohol | iPrOH (boiling point: 82° C.) | 4.0 |  |  |  |  |  |  |  |
|  | Glycol | 1,2-PD (boiling point: 188° C.) |  | 20.0 |  |  |  |  |  |  |
|  |  | 1,2-HexD (boiling point: 224° C.) |  |  | 15.0 |  |  |  |  |  |
|  |  | DEG (boiling point: 244° C.) |  |  |  | 8.0 | 10.0 | 15.0 |  |  |
|  | Other | Glycerol (boiling point: 290° C.) |  |  |  |  |  |  | 8.0 | 10.0 |
| Surfactant |  | Dynol 607 | 0.4 | 0.4 | 0.4 | 0.4 | 0.4 | 0.4 | 0.4 | 0.4 |
| Preservative |  | PROXEL GXL | 0.05 | 0.05 | 0.05 | 0.05 | 0.05 | 0.05 | 0.05 | 0.05 |
| Water |  |  | 54.55 | 37.95 | 43.05 | 50.15 | 47.93 | 43.15 | 49.93 | 47.93 |
| Treatment liquid viscosity (mPa · s) |  |  | 8.3 | 14.0 | 18.0 | 15.0 | 18.0 | 22.0 | 18.0 | 24.0 |
| Treatment liquid pH |  |  | 8.2 | 6.6 | 7.4 | 7.9 | 6.2 | 7.8 | 6.2 | 6.2 |
| Calcium nitrate content (%) |  |  | 13.9 | 13.9 | 13.9 | 13.9 | 13.9 | 13.9 | 13.9 | 13.9 |
| Amount of organic solvent having boiling point of 240° C. or higher (%) |  |  | 0.0 | 0.0 | 0.0 | 8.0 | 10.0 | 15.0 | 8.0 | 10.0 |

| | | | Treatment liquid No. | | | | | | | |
|---|---|---|---|---|---|---|---|---|---|---|
| | | | 17 | 18 | 19 | 20 | 21 | 22 | 23 | 24 |
| Blend amount (%) | Metal salt | Ca(NO$_3$)$_2$·4H$_2$O | 20.0 | 20.0 | 20.0 | 20.0 | 20.0 | 20.0 | 20.0 | 20.0 |
|  |  | CaCl$_2$·2H$_2$O |  |  |  |  |  |  |  |  |
|  |  | NaCl |  |  |  |  |  |  |  |  |
|  | pH adjuster Base | TEA | 1.0 |  | 1.0 |  |  | 1.0 | 1.0 | 1.0 |
|  |  | NaOH |  | 0.5 |  |  |  |  |  |  |
|  | Acid | 35% HCl | 0.62 | 0.4 | 0.62 |  |  | 0.62 | 0.62 | 0.62 |
|  |  | CH$_3$COOH |  |  |  |  |  |  |  |  |
|  | Other | CH$_3$COONa |  |  |  |  |  |  |  |  |
|  | Binder resin | PVA103 varnish (solid fraction: 25%) | 20.0 | 20.0 | 20.0 | 20.0 | 20.0 |  |  | 64.0 |
|  |  | BYK190 (solid fraction: 40%) |  |  |  |  |  | 10.0 | 12.5 |  |
| Organic solvent | Monohydric alcohol | iPrOH (boiling point: 82° C.) |  | 4.0 | 4.0 | 4.0 |  |  |  |  |
|  | Glycol | 1,2-PD (boiling point: 188° C.) |  |  |  | 10.0 | 30.0 | 20.0 |  |  |
|  |  | 1,2-HexD (boiling point: 224° C.) |  |  |  | 10.0 |  |  |  |  |
|  |  | DEG (boiling point: 244° C.) |  |  |  |  |  |  |  |  |

TABLE 1-continued

| | | | | | | | | | | |
|---|---|---|---|---|---|---|---|---|---|---|
| | Other | DEGBE (boiling point: 230° C.) | | | | | | | | |
| | | Glycerol (boiling point: 290° C.) | 15.0 | | | | | | | |
| Surfactant | | Dynol 607 | 0.4 | 0.4 | 0.4 | 0.4 | 0.4 | 0.4 | 0.4 | 0.4 |
| | | EMULGEN 120 | | | | | | | | |
| Preservative | | PROXEL GXL | 0.05 | 0.05 | 0.05 | 0.05 | 0.05 | 0.05 | 0.05 | 0.05 |
| Water | | | 42.93 | 54.65 | 33.93 | 25.55 | 39.55 | 67.93 | 65.43 | 13.93 |
| Treatment liquid viscosity (mPa·s) | | | 32.0 | 8.5 | 17.0 | 17.0 | 17.0 | 4.5 | 5.0 | 100.0 |
| Treatment liquid pH | | | 6.2 | 10.3 | 6.2 | 5.0 | 5.0 | 6.0 | 6.0 | 5.5 |
| Calcium nitrate content (%) | | | 13.9 | 13.9 | 13.9 | 13.9 | 13.9 | 13.9 | 13.9 | 13.9 |
| Amount of organic solvent having boiling point of 240° C. or higher (%) | | | 15.0 | 0.0 | 0.0 | 0.0 | 0.0 | 0.0 | 0.0 | 0.0 |

| | | | Treatment liquid No. | | | | | | | |
|---|---|---|---|---|---|---|---|---|---|---|
| | | | 25 | 26 | 27 | 28 | 29 | 30 | 31 | 32 |
| Blend amount (%) | Metal salt | Ca(NO$_3$)$_2$·4H$_2$O | 20.0 | 17.3 | | | 7.8 | 31.8 | 20.0 | 20.0 |
| | | CaCl$_2$·2H$_2$O | | | 15.0 | | | | | |
| | | NaCl | | | | 20.0 | | | | |
| | pH adjuster | Base TEA | 1.0 | | 1.0 | 1.0 | 1.0 | 1.0 | | |
| | | NaOH | | | | | | | | 0.5 |
| | | Acid 35% HCl | 0.62 | | 0.62 | 0.62 | 0.62 | 0.62 | 0.62 | |
| | | CH$_3$COOH | | | | | | | | |
| | | Other CH$_3$COONa | | | | | | | | |
| | Binder resin | PVA103 varnish (solid fraction: 25%) | 76.0 | | 20.0 | 20.0 | 20.0 | 20.0 | 20.0 | 20.0 |
| | | BYK190 (solid fraction: 40%) | | | | | | | | |
| | Organic solvent | Monohydric alcohol iPrOH (boiling point: 82° C.) | | | 4.0 | 4.0 | 4.0 | 4.0 | 4.0 | 4.0 |
| | | Glycol 1,2-PD (boiling point: 188° C.) | | | | | | | | |
| | | 1,2-HexD (boiling point: 224° C.) | | | | | | | | |
| | | DEG (boiling point: 244° C.) | | | | | | | | |
| | | Other DEGBE (boiling point: 230° C.) | | 15.0 | | | | | | |
| | | Glycerol (boiling point: 290° C.) | | 30.0 | | | | | | |
| | Surfactant | Dynol 607 | 0.4 | | 0.4 | 0.4 | 0.4 | 0.4 | 0.4 | 0.4 |
| | | EMULGEN 120 | | 1 | | | | | | |
| | Preservative | PROXEL GXL | 0.05 | 0.05 | 0.05 | 0.05 | 0.05 | 0.05 | 0.05 | 0.05 |
| Water | | | 1.93 | 36.65 | 58.93 | 53.93 | 66.13 | 42.13 | 54.93 | 55.05 |
| Treatment liquid viscosity (mPa·s) | | | 120.0 | 10.2 | 8.0 | 8.5 | 8.0 | 9.0 | 8.2 | 8.1 |
| Treatment liquid pH | | | 5.6 | 8.0 | 6.5 | 6.2 | 6.6 | 5.5 | 1.7 | 11.5 |
| Calcium nitrate content (%) | | | 13.9 | 12.0 | 0.0 | 0.0 | 5.4 | 22.1 | 13.9 | 13.9 |
| Amount of organic solvent having boiling point of 240° C. or higher (%) | | | 0.0 | 30.0 | 0.0 | 0.0 | 0.0 | 0.0 | 0.0 | 0.0 |

Details regarding the abbreviations and product names for the materials shown in Table 1 are as follows.

<1> Metal Salts
Ca(NO$_3$)$_2$.4H$_2$O: calcium nitrate tetrahydrate
CaCl$_2$.2H$_2$O: calcium chloride dihydrate
NaCl: sodium chloride <2> pH Adjusters
TEA: triethanolamine
NaOH: sodium hydroxide
35% HCl: 35% hydrochloric acid
CH$_3$COOH: acetic acid
CH$_3$COONa: sodium acetate <3> Binder Resins
PVA103 varnish: as described above
BYK190: an aqueous solution of a styrene-maleic acid resin (solid fraction: 40%) manufactured by BYK-Chemie Japan K.K.

<4> Organic Solvents
iPrOH: 2-propanol
1,2-PD: 1,2-propanediol
1,2-HexD: 1,2-hexanediol
DEG: diethylene glycol
DEGBE: diethylene glycol monobutyl ether <5> Surfactants
Dynol 607: an acetylene-based surfactant manufactured by Air Products and Chemicals, Inc.)
EMULGEN 120: polyoxyethylene lauryl ether manufactured by Kao Corporation <6> Additive (Preservative)
PROXEL GXL: a 1,2-benzisothiazol-3-one solution, manufactured by Arch Chemicals, Inc.

II. Preparation of Inkjet Inks (1) Pigment Dispersing Resin

<Production Example for Aqueous Solution of Pigment Dispersing Resin 1>

A reaction container fitted with a gas inlet tube, a thermometer, a condenser and a stirrer was charged with 93.4 parts of butanol, and the container was flushed with nitrogen gas. Subsequently, the contents of the reaction container were heated to 110° C., and a mixture containing 20 parts of styrene, 40 parts of acrylic acid and 40 parts of behenyl acrylate as polymerizable monomers and 6 parts of a polymerization initiator V-601 (manufactured by Wako Pure Chemical Industries, Ltd.) was added dropwise to the container over a period of two hours to achieve a polymerization reaction. Following completion of the dropwise addition, reaction was continued at 110° C. for a further three hours, an additional 0.6 parts of V-601 (manufactured by Wako Pure Chemical Industries, Ltd.) was added, and the reaction was continued at 110° C. for a further one hour, thus obtaining a solution of a pigment dispersing resin 1.

Following cooling of the solution of the pigment dispersing resin 1 to room temperature, 37.1 parts of dimethylaminoethanol was added to neutralize the solution, and 100 parts of water was then added to generate an aqueous solution of a pigment dispersing resin (water-soluble pigment dispersing resin) 1. Subsequently, the aqueous solution was heated to at least 100° C., and the butanol was removed by azeotropic distillation with the water to adjust the solid fraction to 30%. This yielded an aqueous solution of the pigment dispersing resin 1 with a solid fraction of 30%. The above term "aqueous solution" describes a solution containing an aqueous medium, and components dispersed and/or dissolved in the aqueous medium.

Measurement of the pH of the aqueous solution (solid fraction: 30%) of the above pigment dispersing resin 1 using a desktop pH meter F-72 manufactured by Horiba, Ltd. revealed a pH of 9.7. Further, the acid value of the pigment dispersing resin 1 measured using the method described above was 250 mgKOH/g, and the weight average molecular weight was 22,500.

<Production Examples for Aqueous Solutions of Pigment Dispersing Resins 2 to 7>

With the exceptions of altering the types and blend amounts of the polymerizable monomers and the amount of the polymerization initiator as shown below in Table 2, aqueous solutions (solid fraction: 30%) of pigment dispersing resins (water-soluble pigment dispersing resins) 2 to 7 were obtained in the same manner as the pigment dispersing resin 1.

nents thoroughly under heating at 70° C. to dissolve the resin, an aqueous solution (solid fraction: 4%) of Joncryl 678 was obtained.

(2) Pigment Dispersions

<Preparation Examples for Cyan Pigment Dispersions 1 to 7>

Twenty parts of LIONOL BLUE 7358G (C.I. Pigment Blue 15:3) manufactured by Toyo Color Co., Ltd., 20 parts of the aqueous solution (solid fraction: 30%) of the pigment dispersing resin 1 and 60 parts of water were mixed together and preliminary dispersed using a stirrer. Subsequently, the mixture was subjected to a main dispersion for two hours using a Dyno-Mill with a capacity of 0.6 L filled with 1,800 g of zirconia beads of diameter 0.5 mm, thus obtaining a cyan pigment dispersion 1. Further, with the exception of replacing the pigment dispersing resin 1 with each of the pigment dispersing resins 2 to 7, cyan pigment dispersions 2 to 7 were obtained in the same manner as the above cyan pigment dispersion 1.

<Preparation Examples for Magenta Pigment Dispersions 1 to 7>

With the exception of changing the pigment used to Inkjet Magenta E5B02 (C.I. Pigment Violet 19) manufactured by Clariant AG, magenta pigment dispersions 1 to 7 were obtained in the same manner as the preparation examples for the above cyan pigment dispersions 1 to 7.

<Preparation Examples for Yellow Pigment Dispersions 1 to 7>

With the exception of changing the pigment used to LIONOL YELLOW TT-1405G (C.I. Pigment Yellow 14) manufactured by Toyo Color Co., Ltd., yellow pigment dispersions 1 to 7 were obtained in the same manner as the preparation examples for the above cyan pigment dispersions 1 to 7.

TABLE 2

| | | Pigment dispersing resin | | | | | | |
|---|---|---|---|---|---|---|---|---|
| | | 1 | 2 | 3 | 4 | 5 | 6 | 7 |
| Polymerizable monomers | Styrene | 20 | 20 | 30 | 35 | 45 | 20 | 20 |
| | Acrylic acid | 40 | 30 | 16 | 6 | 1 | 50 | 30 |
| | Lauryl methacrylate | | 50 | 44 | 59 | 54 | 30 | 50 |
| | Behenyl acrylate | 40 | | | | | | |
| Polymerization initiator | V-601 | 6 | 6 | 6 | 6 | 6 | 6 | 12 |
| Aqueous solution pH | | 9.7 | 8.1 | 8.5 | 8.8 | 9.2 | 7.4 | 8.1 |
| Acid value (mgKOH/g) | | 250 | 200 | 110 | 40 | 15 | 350 | 200 |
| Weight average molecular weight | | 22,500 | 15,000 | 13,000 | 11,000 | 15,000 | 28,000 | 8,000 |

Table 2 shows the pH of the aqueous solution (solid fraction: 30%) of each pigment dispersing resin, the acid value of each pigment dispersing resin, and the weight average molecular weight of each pigment dispersing resin.

<Production Example for Aqueous Solution of Joncryl 678>

A mixing container was charged sequentially with 4.0 parts of Joncryl 678 (a styrene-acrylic resin manufactured by BASF Corporation, acid value: 215 mgKOH/g, weight average molecular weight: 8,500), 1.7 parts of dimethylaminoethanol and 94.3 parts of water, and by mixing the compo- <Preparation Examples for Black Pigment Dispersions 1 to 7>

With the exception of changing the pigment used to PrinteX 85 (carbon black) manufactured by Orion Engineered Carbons S.A., black pigment dispersions 1 to 7 were obtained in the same manner as the preparation examples for the above cyan pigment dispersions 1 to 7.

<Preparation Example for Cyan Pigment Dispersion 8>

Twenty parts of LIONOL BLUE 7358G (C.I. Pigment Blue 15:3) manufactured by Toyo Color Co., Ltd., 24 parts of Plascoat Z-730 (a carboxyl group-containing polyester resin manufactured by GOO Chemical Co., Ltd., weight average molecular weight: 3,000, acid value: 50 mgKOH/g, solid fraction concentration: 25%) and 56 parts of water were mixed together and preliminary dispersed using a stirrer. Subsequently, the mixture was subjected to a main dispersion for two hours using a Dyno-Mill with a capacity of 0.6 L filled with 1,800 g of zirconia beads of diameter 0.5 mm, thus obtaining a cyan pigment dispersion 8.

<Preparation Examples for Magenta Pigment Dispersion 8, Yellow Pigment Dispersion 8 and Black Pigment Dispersion 8>

With the exception of changing the pigment used to Inkjet Magenta E5B02 (C.I. Pigment Violet 19) manufactured by Clariant AG, LIONOL YELLOW TT-1405G (C.I. Pigment Yellow 14) manufactured by Toyo Color Co., Ltd., and PrinteX 85 (carbon black) manufactured by Orion Engineered Carbons S.A. respectively, a magenta pigment dispersion 8, yellow pigment dispersion 8 and black pigment dispersion 8 were obtained in the same manner as the preparation example for the above cyan pigment dispersion 8.

<Preparation Example for Cyan Pigment Dispersion 9>

A mixing container was charged sequentially with 75.0 parts of the aqueous solution of Joncryl 678 produced above and 10.0 parts of water, and the components were mixed thoroughly. Subsequently, 15 parts of C.I. Pigment Blue 15:3 was added and stirred thoroughly. A main dispersion was then conducted in the same manner as that described above for the cyan pigment dispersion 1 using a Dyno-Mill with a capacity of 0.6 L, thus obtaining a cyan pigment dispersion 9 (pigment concentration: 15%).

<Preparation Examples for Magenta Pigment Dispersion 9, Yellow Pigment Dispersion 9 and Black Pigment Dispersion 9>

With the exception of changing the C.I. Pigment Blue 15:3 to Inkjet Magenta E5B02 (C.I. Pigment Violet 19) manufactured by Clariant AG, LIONOL YELLOW TT-1405G (C.I. Pigment Yellow 14) manufactured by Toyo Color Co., Ltd., and PrinteX 85 (carbon black) manufactured by Orion Engineered Carbons S.A. respectively, a magenta pigment dispersion 9, yellow pigment dispersion 9 and black pigment dispersion 9 (each having a pigment concentration of 15%) were obtained in the same manner as the preparation example for the above cyan pigment dispersion 9.

(3) Inkjet Ink Sets

<Production Example for CMYK Inkjet Ink Set 1>

The materials listed below were added sequentially to a mixing container under constant stirring with a stirrer, and were mixed thoroughly until a uniform mixture was obtained. Subsequently, a filtration was performed using a membrane filter having a pore size of 1 μm to remove coarse particles that can cause inkjet head blockages, thus obtaining an ink. More specifically, by conducting the above step with each of the previously prepared cyan pigment dispersion 1, magenta pigment dispersion 1, yellow pigment dispersion 1 and black pigment dispersion 1, a cyan ink, magenta ink, yellow ink and black ink were obtained. Using these four color inks, a CMYK inkjet ink set 1 was produced.

(Materials)

| | |
|---|---|
| Pigment dispersion 1 | 30 parts (each of the previously prepared pigment dispersions 1 of cyan, magenta, yellow and black) |
| Joncryl 8211 (an acrylic resin emulsion manufactured by BASF Corporation, solid fraction: 44%, acid value: 26 mgKOH/g) | 13 parts |
| 1,2-propanediol | 17 parts |
| 1,3-propanediol | 10 parts |
| Triethanolamine | 0.5 parts |
| Surfynol 465 (an acetylene-based surfactant manufactured by Air Products and Chemicals, Inc.) | 1 part |
| PROXEL GXL | 0.05 parts |
| Ion-exchanged water | 28.45 parts |

The viscosity of each of the obtained inks at 25° C. was measured using an E-type viscometer (TVE25L viscometer, manufactured by Toki Sangyo Co., Ltd.). The average value of the viscosities of the cyan ink, magenta ink, yellow ink and black ink that constitute the above CMYK inkjet ink set 1 is shown in Table 3.

Further, the weighted average boiling point for the water-soluble organic solvent shown in Table 3 represents the value for the weighted average boiling point at one atmosphere. This weighted average boiling point is a value obtained by calculating, for each water-soluble organic solvent, a multiplication value of the boiling point at one atmosphere and the mass ratio of that organic solvent relative to the total mass of all of the water-soluble organic solvents, and then adding together the calculated multiplication values for the various water-soluble organic solvents.

<Production Examples for CMYK Inkjet Ink Sets 2 to 34>

With the exception of using the materials shown below in Table 3, the same method as that described for the inkjet ink set 1 was used to obtain CMYK inkjet ink sets 2 to 34 (each composed of the four colors of C, M, Y, K). For each of these inkjet ink sets, the viscosity was measured and the weighted average boiling point of the water-soluble organic solvents at one atmosphere was determined in the same manner as described for the inkjet ink set 1. These results are shown in Table 3.

TABLE 3

| | | | CMYK inkjet ink set | | | | | | | | | |
|---|---|---|---|---|---|---|---|---|---|---|---|---|
| | | | 1 | 2 | 3 | 4 | 5 | 6 | 7 | 8 | 9 | 10 |
| Blend amount (%) | Pigment dispersion | Pigment dispersion 1 | 30.0 | | | | | | | | | 30.0 |
| | | Pigment dispersion 2 | | 30.0 | | | | | | | | |
| | | Pigment dispersion 3 | | | 30.0 | | | | | | | |
| | | Pigment dispersion 4 | | | | 30.0 | | | | | | |
| | | Pigment dispersion 5 | | | | | 30.0 | | | | | |

TABLE 3-continued

| | | | 1 | 2 | 3 | 4 | 5 | 6 | 7 | 8 | 9 | 10 |
|---|---|---|---|---|---|---|---|---|---|---|---|---|
| | | Pigment dispersion 6 | | | | | | 30.0 | | | | |
| | | Pigment dispersion 7 | | | | | | | 30.0 | | | |
| | | Pigment dispersion 8 | | | | | | | | 30.0 | | |
| Pigment self-dispersion | | CABOJET | | | | | | | | | 60.0 | |
| Binder resin | | Joncryl 8211 (solid fraction: 44%) | 13.0 | 13.0 | 13.0 | 13.0 | 13.0 | 13.0 | 13.0 | 13.0 | 13.0 | 13.0 |
| Water-soluble organic solvent | Diol (A) | EG (boiling point: 198° C.) | | | | | | | | | | |
| | | 1,2-PD (boiling point: 188° C.) | 17.0 | 17.0 | 17.0 | 17.0 | 17.0 | 17.0 | 17.0 | 17.0 | 16.0 | 17.0 |
| | | 1,3-PD (boiling point: 214° C.) | 10.0 | 10.0 | 10.0 | 10.0 | 10.0 | 10.0 | 10.0 | 10.0 | 9.0 | |
| | | 1,2-BuD (boiling point: 194° C.) | | | | | | | | | | |
| | | 1,2-HexD (boiling point: 223° C.) | | | | | | | | | | |
| | | 3-M-1,5-PenD (boiling point: 250° C.) | | | | | | | | | | |
| | Diethylene glycol | DEG (boiling point: 244° C.) | | | | | | | | | | 10.0 |
| | Alkyl polyol | Glycerol (boiling point: 290° C.) | | | | | | | | | | |
| pH adjuster | | TEA | 0.5 | 0.5 | 0.5 | 0.5 | 0.5 | 0.5 | 0.5 | 0.5 | 0.5 | |
| | | NaOH | | | | | | | | | | 0.1 |
| Surfactant | acetylene-based | Surfynol 465 | 1.0 | 1.0 | 1.0 | 1.0 | 1.0 | 1.0 | 1.0 | 1.0 | 1.0 | 1.0 |
| | | Surfynol 104E | | | | | | | | | | |
| Preservative | | PROXEL GXL | 0.05 | 0.05 | 0.05 | 0.05 | 0.05 | 0.05 | 0.05 | 0.05 | 0.05 | 0.05 |
| | | Water | 28.45 | 28.45 | 28.45 | 28.45 | 28.45 | 28.45 | 28.45 | 28.45 | 0.45 | 28.85 |
| | | Viscosity | 8.0 | 7.7 | 7.5 | 7.4 | 7.9 | 8.3 | 7.1 | 7.3 | 7.4 | 9.5 |
| | | Amount of organic solvent having boiling point of 240° C. or higher (%) | 0.0 | 0.0 | 0.0 | 0.0 | 0.0 | 0.0 | 0.0 | 0.0 | 0.0 | 10.0 |
| | | Weighted average boiling point of water-soluble organic solvents (° C.) | 197.6 | 197.6 | 197.6 | 197.6 | 197.6 | 197.6 | 197.6 | 197.6 | 197.4 | 208.7 |

| | | | CMYK inkjet ink set | | | | | | | | |
|---|---|---|---|---|---|---|---|---|---|---|---|
| | | | 11 | 12 | 13 | 14 | 15 | 16 | 17 | 18 | 19 |
| Blend amount (%) | Pigment dispersion | Pigment dispersion 1 | 30.0 | 30.0 | 30.0 | 30.0 | 30.0 | 30.0 | 30.0 | 30.0 | 30.0 |
| | | Pigment dispersion 2 | | | | | | | | | |
| | | Pigment dispersion 3 | | | | | | | | | |
| | | Pigment dispersion 4 | | | | | | | | | |
| | | Pigment dispersion 5 | | | | | | | | | |
| | | Pigment dispersion 6 | | | | | | | | | |
| | | Pigment dispersion 7 | | | | | | | | | |
| | | Pigment dispersion 8 | | | | | | | | | |
| | Pigment self-dispersion | CABOJET | | | | | | | | | |
| | Binder resin | Joncryl 8211 (solid fraction: 44%) | 13.0 | 13.0 | 13.0 | 13.0 | 13.0 | 13.0 | 13.0 | 13.0 | 13.0 |
| | Water-soluble organic solvent | Diol (A) EG (boiling point: 198° C.) | 17.0 | | | | | | | | |
| | | 1,2-PD (boiling point: 188° C.) | | | | 5.0 | 4.0 | 15.0 | 17.0 | | |
| | | 1,3-PD (boiling point: 214° C.) | | | | | 2.0 | | | | 17.0 |
| | | 1,2-BuD | | 17.0 | | | | | | 10.0 | |

TABLE 3-continued

|  |  |  |  |  |  |  |  |  |  |  |
|---|---|---|---|---|---|---|---|---|---|---|
|  |  | (boiling point: 194° C.) |  |  |  |  |  |  |  |  |
|  |  | 1,2-HexD (boiling point: 223° C.) |  |  | 17.0 |  |  |  |  | 10.0 |
|  |  | 3-M-1,5-PenD (boiling point: 250° C.) |  |  |  | 17.0 |  |  |  |  |
|  | Diethylene glycol | DEG (boiling point: 244° C.) |  | 15.0 | 17.0 | 10.0 |  |  |  |  |
|  | Alkyl polyol | Glycerol (boiling point: 290° C.) | 10.0 | 15.0 |  |  |  | 10.0 |  |  |
| pH adjuster |  | TEA |  |  |  |  | 1.0 | 1.0 | 1.0 | 1.0 |
|  |  | NaOH | 0.1 | 0.1 | 0.1 | 0.1 | 0.1 |  |  |  |
| Surfactant | acetylene-based | Surfynol 465 | 1.0 | 1.0 | 1.0 | 1.0 | 1.0 |  |  | 0.5 |
|  |  | Surfynol 104E |  |  |  |  |  | 1.0 | 1.0 | 0.5 |
| Preservative |  | PROXEL GXL | 0.05 | 0.05 | 0.05 | 0.05 | 0.05 | 0.05 | 0.05 | 0.05 | 0.05 |
| Water |  |  | 28.85 | 23.85 | 23.85 | 21.85 | 40.85 | 38.95 | 39.95 | 28.45 | 28.45 |
| Viscosity |  |  | 12.0 | 8.2 | 10.0 | 12.0 | 10.1 | 7.8 | 7.3 | 7.4 | 7.8 |
| Amount of organic solvent having boiling point of 240° C. or higher (%) |  |  | 10.0 | 15.0 | 15.0 | 34.0 | 10.0 | 10.0 | 0.0 | 0.0 | 0.0 |
| Weighted average boiling point of water-soluble organic solvents (° C.) |  |  | 232.1 | 239.0 | 232.8 | 247.0 | 225.3 | 255.0 | 188.0 | 190.2 | 217.3 |

|  |  |  | CMYK inkjet ink set |  |  |  |  |  |  |  |  |  |
|---|---|---|---|---|---|---|---|---|---|---|---|---|
|  |  |  | 20 | 21 | 22 | 23 | 24 | 25 | 26 | 27 | 28 | 29 |
| Blend amount (%) | Pigment dispersion | Pigment dispersion 1 | 30.0 | 30.0 | 30.0 | 30.0 | 30.0 | 30.0 | 30.0 | 30.0 | 30.0 | 30.0 |
|  |  | Pigment dispersion 9 |  |  |  |  |  |  |  |  |  |  |
|  | Binder resin | Joncryl 8211 (solid fraction: 44%) | 13.0 | 13.0 | 13.0 | 13.0 | 13.0 |  |  |  |  |  |
|  |  | X-345 (solid fraction: 37%) |  |  |  |  |  | 12.0 | 12.0 | 12.0 | 12.0 | 12.0 |
|  |  | JDX6500 (solid fraction: 29.5%) |  |  |  |  |  |  |  |  |  |  |
| Water-soluble organic solvent | Diol (A) | 1,2-PD (boiling point: 188° C.) | 8.5 | 3.5 | 1.0 |  |  | 3.0 | 3.0 | 3.0 | 3.0 | 3.0 |
|  |  | 1,3-PD (boiling point: 214° C.) |  |  |  |  |  | 10.0 | 10.0 | 10.0 | 10.0 | 10.0 |
|  |  | 1,2-HexD (boiling point: 223° C.) |  |  |  |  |  | 5.0 | 5.0 | 5.0 | 5.0 | 5.0 |
|  |  | 3-M-1,5-PenD (boiling point: 250° C.) | 8.5 | 13.5 | 16.0 | 17.0 | 17.0 |  |  |  |  |  |
|  | Diethylene glycol | DEG (boiling point: 244° C.) | 10.0 | 10.0 | 10.0 | 10.0 | 10.0 |  | 10.0 |  |  |  |
|  | Alkyl polyol | Glycerol (boiling point: 290° C.) |  |  |  |  |  | 10.0 |  |  |  |  |
|  | Glycol ether | TEGBE (boiling point: 278° C.) |  |  |  |  |  |  |  |  |  |  |
|  |  | DEGME (boiling point: 194° C.) |  |  |  |  |  |  |  | 10.0 |  |  |
|  |  | PGME (boiling point: 121° C.) |  |  |  |  |  |  |  |  |  | 10.0 |
|  | Monohydric alcohol | 3MB (boiling point: 158° C.) |  |  |  |  |  |  |  |  | 10.0 |  |
| pH adjuster |  | TEA |  |  |  |  |  | 1.0 | 1.0 | 1.0 | 1.0 | 1.0 |
|  |  | NaOH | 0.1 | 0.1 | 0.1 | 0.1 | 0.1 |  |  |  |  |  |

TABLE 3-continued

| | | | | | | | | | | | | | |
|---|---|---|---|---|---|---|---|---|---|---|---|---|---|
| Surfactant | Acetylene-based | Surfynol 465 | 1.0 | 1.0 | 1.0 | 1.0 | | | | | | |
| | | Surfynol 104E | | | | | 1.0 | 1.0 | 1.0 | 1.0 | 1.0 | 1.0 |
| | Siloxane-based | BYK348 | | | | | | | | | | |
| | Fluorine-based | Zonyl FS-300 | | | | | | | | | | |
| Preservative | | PROXEL GXL | 0.05 | 0.05 | 0.05 | 0.05 | 0.05 | 0.05 | 0.05 | 0.05 | 0.05 | 0.05 |
| Water | | | 28.85 | 28.85 | 28.85 | 28.85 | 28.85 | 27.95 | 27.95 | 27.95 | 27.95 | 27.95 |
| Viscosity | | | 9.7 | 9.9 | 10.0 | 10.2 | 10.0 | 8.4 | 8.3 | 8.0 | 7.9 | 7.7 |
| Amount of organic solvent having boiling point of 240° C. or higher (%) | | | 18.5 | 23.5 | 26.0 | 27.0 | 27.0 | 10.0 | 10.0 | 0.0 | 0.0 | 0.0 |
| Weighted average boiling point of water-soluble organic solvents (° C.) | | | 228.3 | 239.7 | 245.5 | 247.8 | 247.8 | 219.4 | 205.2 | 189.6 | 178.4 | 167.0 |

| | | | CMYK inkjet ink set | | | | |
|---|---|---|---|---|---|---|---|
| | | | 30 | 31 | 32 | 33 | 34 |
| Blend amount (%) | Pigment dispersion | Pigment dispersion 1 | 30.0 | | 30.0 | 30.0 | 30.0 |
| | | Pigment dispersion 9 | | 33.0 | | | |
| | Binder resin | Joncryl 8211 (solid fraction: 44%) | | | 13.0 | 13.0 | 13.0 |
| | | X-345 (solid fraction: 37%) | | | | | |
| | | JDX6500 (solid fraction: 29.5%) | 15.0 | 10.0 | | | |
| | Water-soluble organic solvent | Diol (A) | 1,2-PD (boiling point: 188° C.) | 11.5 | 15.0 | | 17.0 | 17.0 |
| | | 1,3-PD (boiling point: 214° C.) | | | | 10.0 | 10.0 |
| | | 1,2-HexD (boiling point: 223° C.) | | | | | |
| | | 3-M-1,5-PenD (boiling point: 250° C.) | | | | | |
| | Diethylene glycol | DEG (boiling point: 244° C.) | | | 10.0 | | |
| | Alkyl polyol | Glycerol (boiling point: 290° C.) | | 25.0 | 17.0 | | |
| | Glycol ether | TEGBE (boiling point: 278° C.) | | | 5.0 | | |
| | | DEGME (boiling point: 194° C.) | 3.0 | | | | |
| | | PGME (boiling point: 121° C.) | | | | | |
| | Monohydric alcohol | 3MB (boiling point: 158° C.) | | | | | |
| | pH adjuster | TEA | 1.0 | | 0.5 | 0.5 | 0.5 |
| | | NaOH | | | | | |
| | Surfactant | Acetylene-based | Surfynol 465 | | 0.5 | 1.0 | | |
| | | | Surfynol 104E | 1.0 | | | 1.0 | |
| | Siloxane-based | BYK348 | | | | 1.0 | |
| | Fluorine-based | Zonyl FS-300 | | | | | 1.0 |
| | Preservative | PROXEL GXL | 0.05 | 0.05 | 0.05 | 0.05 | 0.05 |
| | Water | | 38.45 | 11.45 | 28.45 | 28.45 | 28.45 |
| | Viscosity | | 7.5 | 10.0 | 13.8 | 7.9 | 7.9 |
| | Amount of organic solvent having boiling point of 240° C. or higher (%) | | 0.0 | 30.0 | 27.0 | 0.0 | 0.0 |
| | Weighted average boiling point of water-soluble organic solvents (° C.) | | 189.2 | 254.7 | 273.0 | 197.6 | 197.6 |

Of the materials shown in Table 3, details regarding the materials and abbreviations not used in Table 1 or the above description are as follows.

<Pigment Dispersions>
CABOJET:
Cyan: Cabojet 250C (a self-dispersing copper phthalocyanine pigment dispersion, manufactured by Cabot Corporation, pigment concentration: 10%)
Magenta: Cabojet 265M (a self-dispersing magenta pigment dispersion, manufactured by Cabot Corporation, pigment concentration: 10%)
Yellow: Cabojet 270 (a self-dispersing yellow pigment dispersion, manufactured by Cabot Corporation, pigment concentration: 10%)
Black: Cabojet 200 (a self-dispersing carbon black aqueous solution, manufactured by Cabot Corporation, pigment concentration: 20%) was diluted with an equal volume of water to adjust the pigment concentration to 10%
X-345: Hiros X-345 (a styrene-acrylic water-soluble resin solution, manufactured by BASF Corporation, solid fraction: 37% (and containing 35% of 2-propanol), acid value: 40 mgKOH/g)
JDX6500: Joncryl JDX6500 (a styrene-acrylic water-soluble resin solution, manufactured by BASF Corporation, solid fraction: 29.5%, acid value: 74 mgKOH/g)
<Water-Soluble Organic Solvents>
EG: ethylene glycol
1,2-PD: 1,2-propanediol
1,3-PD: 1,3-propanediol
1,2-BuD: 1,2-butanediol
1,2-HexD: 1,2-hexanediol
3-M-1,5-PenD: 3-methyl-1,5-pentanediol
TEGBE: triethylene glycol monobutyl ether
DEGME: diethylene glycol monomethyl ether
PGME: propylene glycol monomethyl ether
3 MB: 3-methoxy-1-butanol
<Surfactants>
Surfynol 104E: an acetylene-based surfactant manufactured by Air Products and Chemicals, Inc.
BYK348: a siloxane-based surfactant manufactured by BYK-Chemie Japan K.K.
Zonyl FS-300: a fluorine-based surfactant manufactured by E. I. du Pont de Nemours and Company.

III. Evaluations of Treatment Liquids and Inkjet Inks (1) Production Examples for Recording Media with Applied Treatment Liquid <Production Example for Recording Medium 1a with Applied Treatment Liquid>

Using a print tester Flexiproof 100 (manufactured by Matsuo Sangyo Co., Ltd.), the treatment liquid 1 prepared in the manner described above was coated uniformly onto OK Top Coat+paper (manufactured by Oji Holdings Corporation, grammage: 104.7 g/m², referred to as "recording medium A" in the subsequent description and Tables 4 to 6). The coating was performed using a ceramic roller having 140 ridges/inch at a speed of 80 m/min, so as to achieve a coating film thickness of the treatment liquid 1 of 3.0±0.3 µm. Following application of the treatment liquid 1 in the manner described above, the OK Top Coat+paper was dried for three minutes in a 50° C. air oven, thus completing production of a recording medium 1a with the applied treatment liquid.

<Production Examples for Recording Media 2a to 26a and 33a to 38a with Applied Treatment Liquids>

Using the same method as the recording medium 1a with the applied treatment liquid, recording media 2a to 26a and 33a to 38a each with an applied treatment liquid were produced using the treatment liquids shown in Table 4.

<Production Example for Recording Medium 27a with Applied Treatment Liquid>

With the exceptions of using the treatment liquid 3 prepared above, and using the print tester Flexiproof 100 with a ceramic roller having 1,000 ridges/inch so as to achieve a coating film thickness of the treatment liquid 3 of 0.4±0.1 µm, a recording medium 27a with an applied treatment liquid was produced in the same manner as the recording medium 1a with an applied treatment liquid.

<Production Example for Recording Medium 28a with Applied Treatment Liquid>

Following production of the recording medium 3a with an applied treatment liquid, a print tester Flexiproof 100 with a ceramic roller having 140 ridges/inch was used to apply a second coating of the treatment liquid 3 to the surface already coated with the treatment liquid 3, and the recording medium was then dried for three minutes in a 50° C. air oven. This process was repeated a further two times to produce a recording medium 28a with an applied treatment liquid in which the total wet coating film thickness of the treatment liquid 3 was 12.0±1.2 µm.

<Production Examples for Recording Media 29a to 31a and 39a with Applied Treatment Liquids>

With the exceptions of using the treatment liquids 2 to 4 and 27, and using Npi high-quality paper 45 (manufactured by Nippon Paper Industries Co., Ltd., grammage: 52.3 g/m², referred to as "recording medium B" in the subsequent description and Tables 4 to 6) as the recording medium, recording media 29a to 31a and 39a with applied treatment liquids were produced in the same manner as the recording medium 1a with an applied treatment liquid.

<Production Example for Recording Medium 32a with Applied Treatment Liquid>

With the exception of using the treatment liquid 3 and using a 100% cotton white cloth (referred to as "recording medium C" in the subsequent description and Tables 4 to 6) as the recording medium, a recording medium 32a with an applied treatment liquid was produced in the same manner as the recording medium 1a with an applied treatment liquid.

TABLE 4

| Recording medium with applied treatment liquid | Treatment liquid No. | Recording medium | Coating film thickness (µm) | Amount of calcium ions on recording medium surface (mmol/m²) |
|---|---|---|---|---|
| 1a | 1 | A | 3.0 | 2.5 |
| 2a | 2 | A | 3.0 | 2.5 |
| 3a | 3 | A | 3.0 | 2.5 |
| 4a | 4 | A | 3.0 | 2.5 |
| 5a | 5 | A | 3.0 | 2.5 |
| 6a | 6 | A | 3.0 | 2.5 |
| 7a | 7 | A | 3.0 | 2.5 |
| 8a | 8 | A | 3.0 | 2.5 |
| 9a | 9 | A | 3.0 | 2.5 |
| 10a | 10 | A | 3.0 | 2.5 |
| 11a | 11 | A | 3.0 | 2.5 |
| 12a | 12 | A | 3.0 | 2.5 |
| 13a | 13 | A | 3.0 | 2.5 |
| 14a | 14 | A | 3.0 | 2.5 |
| 15a | 15 | A | 3.0 | 2.5 |
| 16a | 16 | A | 3.0 | 2.5 |

TABLE 4-continued

| Recording medium with applied treatment liquid | Treatment liquid No. | Recording medium | Coating film thickness (μm) | Amount of calcium ions on recording medium surface (mmol/m²) |
|---|---|---|---|---|
| 17a | 17 | A | 3.0 | 2.5 |
| 18a | 18 | A | 3.0 | 2.5 |
| 19a | 19 | A | 3.0 | 2.5 |
| 20a | 20 | A | 3.0 | 2.5 |
| 21a | 21 | A | 3.0 | 2.5 |
| 22a | 22 | A | 3.0 | 2.5 |
| 23a | 23 | A | 3.0 | 2.5 |
| 24a | 24 | A | 3.0 | 2.5 |
| 25a | 25 | A | 3.0 | 2.5 |
| 26a | 26 | A | 3.0 | 2.5 |
| 27a | 3 | A | 0.4 | 0.3 |
| 28a | 3 | A | 12.0 | 10.2 |
| 29a | 2 | B | 3.0 | 2.5 |
| 30a | 3 | B | 3.0 | 2.5 |
| 31a | 4 | B | 3.0 | 2.5 |
| 32a | 3 | C | 3.0 | 2.5 |
| 33a | 27 | A | 3.0 | 2.1 |
| 34a | 28 | A | 3.0 | 0.0 |
| 35a | 29 | A | 3.0 | 4.0 |
| 36a | 30 | A | 3.0 | 10.0 |
| 37a | 31 | A | 3.0 | 2.5 |
| 38a | 32 | A | 3.0 | 2.5 |
| 39a | 27 | B | 3.0 | 2.1 |

(2) Evaluation of Treatment Liquid Coating Irregularities

<Evaluation of Treatment liquid Coating Irregularities (Initial)>

In order to enhance the visibility, 0.1 g of Kayafect Red P Liquid (manufactured by Nippon Kayaku Co., Ltd.) was added to 9.9 g samples of each of the treatment liquids 1 to 26 produced above. These samples were then each mixed thoroughly to dissolve the dye, thus obtaining colored treatment liquids 1 to 26. Using a Flexiproof 100 (manufactured by Matsuo Sangyo Co., Ltd.), each of these colored treatment liquids was coated uniformly onto the recording medium shown below in Table 5. The coating of the colored treatment liquid was performed using a ceramic roller having 140 ridges/inch at a speed of 80 m/min, so as to achieve a coating film thickness of the treatment liquid 1 of 3.0±0.3 μm. Following application of the treatment liquid, the recording medium was dried for three minutes in a 50° C. air oven, thus completing production of a recording media 1b to 30b each with an applied colored treatment liquid.

The level of treatment liquid coating irregularities (the initial coating applicability) was evaluated by continuously producing 10 copies of each recording medium with an applied colored treatment liquid using the method described above, and visually inspecting each recording medium for color irregularities. The evaluation criteria were as follows, with evaluations of A and B being deemed a good level of coating irregularities for the treatment liquid.

(Evaluation criteria)
  A: absolutely no coating irregularities observed in any of the 10 copies.
  B: coating irregularities observed in one or two of the 10 copies.
  C: coating irregularities observed in at least three of the 10 copies.

<Evaluation of Treatment liquid Coating Irregularities (after Aging)>

Ten kg of each of the above treatment liquids 1 to 26 was placed in an 18-liter drum, and with the drum unsealed in an open state, the drum was left to stand for one week at room temperature. Subsequently, the solid fraction concentration of each treatment liquid was measured, and if the measured value was greater than that prior to the standing period, then water was added to adjust the solid fraction concentration to the same as that prior to standing, thus completing preparation of aged treatment liquids 1 to 26.

Using the above aged treatment liquids 1 to 26, aged colored treatment liquids 1 to 26 were prepared using the same method as that described above in the evaluation method for treatment liquid coating irregularities. Recording media 1c to 30c with these applied aged colored treatment liquids were then produced, and the level of treatment liquid coating irregularities after aging (the coating applicability after aging) was evaluated. The same evaluation criteria as those described above were used.

The evaluation results for the above coating irregularities are shown in Table 5.

TABLE 5

| Recording medium with applied colored treatment liquid | Recording medium with applied aged colored treatment liquid | Treatment liquid No. | Recording medium | Treatment liquid coating irregularities | |
|---|---|---|---|---|---|
| | | | | Initial | After aging |
| 1b | 1c | 1 | A | A | A |
| 2b | 2c | 2 | A | A | A |
| 3b | 3c | 3 | A | A | A |
| 4b | 4c | 4 | A | A | A |
| 5b | 5c | 5 | A | A | A |
| 6b | 6c | 6 | A | A | B |
| 7b | 7c | 7 | A | A | B |
| 8b | 8c | 8 | A | A | B |
| 9b | 9c | 9 | A | A | B |
| 10b | 10c | 10 | A | A | A |
| 11b | 11c | 11 | A | A | A |
| 12b | 12c | 12 | A | A | A |
| 13b | 13c | 13 | A | A | A |
| 14b | 14c | 14 | A | A | A |
| 15b | 15c | 15 | A | A | A |
| 16b | 16c | 16 | A | A | A |
| 17b | 17c | 17 | A | A | A |
| 18b | 18c | 18 | A | A | A |
| 19b | 19c | 19 | A | A | A |
| 20b | 20c | 20 | A | A | A |
| 21b | 21c | 21 | A | A | A |
| 22b | 22c | 22 | A | B | B |
| 23b | 23c | 23 | A | A | A |
| 24b | 24c | 24 | A | A | A |
| 25b | 25c | 25 | A | B | B |
| 26b | 26c | 26 | A | A | B |
| 27b | 27c | 2 | B | A | A |
| 28b | 28c | 3 | B | A | A |
| 29b | 29c | 4 | B | A | A |
| 30b | 30c | 3 | C | A | A |

IV. Evaluation of Ink Sets

Examples 1 to 61, Comparative Examples 1 to 11

(1) Preparation of Inkjet Ink Set Printing Apparatus

Four inkjet heads KJ4B-1200 (manufactured by Kyocera Corporation) were installed above a conveyor capable of transporting a recording medium, and the K, C, M and Y inkjet inks that constitute an inkjet ink set were used to fill these heads in sequence from the upstream side. The design resolution of these inkjet heads is 1,200 dpi, the maximum drive frequency is 64 kHz, and the recording resolution in the recording medium transport direction during printing at the maximum drive frequency and a printing speed of 80 m/min is 1,200 dpi.

(2) Production of Printed Matter

<Printing of Printed Matter for Evaluating Aggregation Properties (Color Mixing)>

Each of the recording media with an applied treatment liquid produced in the manner described above was secured to the conveyor of the aforementioned inkjet ink set printing apparatus, and the conveyor was driven at a fixed speed listed below. On the other hand, as the recording medium with the applied treatment liquid passed beneath the installed location of the inkjet heads, the inkjet inks were jetted onto the recording medium in KCMY order using a drop volume of 3 pL to print a natural image N5 (bicycle) from the high-precision color digital standard image data (CMYK/SCID) prescribed in JIS X 9201. Within 10 seconds of the completion of printing, the printed matter was fed into a 50° C. air oven and dried for three minutes, thus obtaining printed matter for evaluating bleeding. The above conveyor speed was set to one of three speeds: 40 m/min, 60 m/min and 80 m/min, with printing conducted under each of these conditions to obtain printed matter. For a portion of the ink sets described below, the same printing was also conducted at a conveyor speed of 100 m/min.

<Printing of Solid Printed Matter>

Each of the recording media with an applied treatment liquid produced in the manner described above was secured to the conveyor of the aforementioned inkjet ink set printing apparatus, and the conveyor was driven at a fixed speed listed below. On the other hand, as the recording medium with the applied treatment liquid passed beneath the installed location of the inkjet heads, the KCMY inkjet inks were jetted onto the recording medium using a drop volume of 3 pL to print an image in which 3 cm×3 cm solid printing portions with a print ratio of 100% were arranged adjacent to one another in CMYK order. Within 10 seconds of the completion of printing, the printed matter was fed into a 50° C. air oven and dried for three minutes, thus obtaining solid printed matter. The above conveyor speed was set to one of three speeds: 40 m/min, 60 m/min and 80 m/min, with printing conducted under each of these conditions to obtain printed matter. For a portion of the ink sets described below, the same printing was also conducted at a conveyor speed of 100 m/min.

The various combinations of recording media an inkjet inks used in producing the above printed matter were as shown below in Table 6.

(3) Evaluations of Printed Matter

The printed matter for evaluating aggregation properties and the solid printed matter produced above were subjected to each of the evaluations described below. The evaluation results obtained are shown below in Table 6.

TABLE 6

| | Recording medium with applied treatment liquid | Recording medium with aged applied treatment liquid | Treatment liquid No. | Recording medium | Coating film thickness (μm) | CMYK inkjet ink set | Evaluation results Initial | | | | | After aging Coverage |
|---|---|---|---|---|---|---|---|---|---|---|---|---|
| | | | | | | | Aggregation properties | Aggregation properties at 100 m/min printing | Coverage | Coverage at 100 m/min printing | OD | |
| Example 1 | 1a | 1d | 1 | A | 3 | 1 | B | — | A | — | A | A |
| Example 2 | 2a | 2d | 2 | A | 3 | 1 | A | — | A | — | A | A |
| Example 3 | 3a | 3d | 3 | A | 3 | 1 | A | A | A | B | A | A |
| Example 4 | 4a | 4d | 4 | A | 3 | 1 | A | — | A | — | A | A |
| Example 5 | 5a | 5d | 5 | A | 3 | 1 | B | — | A | — | A | A |
| Example 6 | 6a | 6d | 6 | A | 3 | 1 | A | — | B | — | A | B |
| Example 7 | 7a | 7d | 7 | A | 3 | 1 | A | — | B | — | A | B |
| Example 8 | 8a | 8d | 8 | A | 3 | 1 | A | — | A | — | A | A |
| Example 9 | 9a | 9d | 9 | A | 3 | 1 | A | — | A | — | A | A |
| Example 10 | 10a | 10d | 10 | A | 3 | 1 | A | — | A | — | A | A |
| Example 11 | 11a | 11d | 11 | A | 3 | 1 | A | — | A | — | A | A |
| Example 12 | 12a | 12d | 12 | A | 3 | 1 | A | — | A | — | A | A |
| Example 13 | 13a | 13d | 13 | A | 3 | 1 | B | — | A | — | A | A |
| Example 14 | 14a | 14d | 14 | A | 3 | 1 | C | — | A | — | A | A |
| Example 15 | 15a | 15d | 15 | A | 3 | 1 | A | — | A | — | A | A |
| Example 16 | 16a | 16d | 16 | A | 3 | 1 | B | — | A | — | A | A |
| Example 17 | 17a | 17d | 17 | A | 3 | 1 | C | — | A | — | A | A |
| Example 18 | 18a | 18d | 18 | A | 3 | 1 | B | — | B | — | B | B |
| Example 19 | 19a | 19d | 19 | A | 3 | 1 | A | — | A | — | A | A |
| Example 20 | 20a | 20d | 20 | A | 3 | 1 | A | — | A | — | A | B |
| Example 21 | 21a | 21d | 21 | A | 3 | 1 | A | — | A | — | A | B |
| Example 22 | 22a | 22d | 22 | A | 3 | 1 | A | — | A | — | A | A |
| Example 23 | 23a | 23d | 23 | A | 3 | 1 | A | — | A | — | A | A |
| Example 24 | 24a | 24d | 24 | A | 3 | 1 | A | — | A | — | A | A |
| Example 25 | 25a | 25d | 25 | A | 3 | 1 | A | — | A | — | A | A |
| Example 26 | 3a | 3d | 3 | A | 3 | 2 | A | A | A | B | A | A |
| Example 27 | 3a | 3d | 3 | A | 3 | 3 | A | A | A | B | A | A |
| Example 28 | 3a | 3d | 3 | A | 3 | 4 | A | A | B | — | A | B |

TABLE 6-continued

| | Recording medium with applied treatment liquid | Recording medium with aged applied treatment liquid | Treatment liquid No. | Recording medium | Coating film thickness (μm) | CMYK inkjet ink set | Evaluation results Initial Aggregation properties | Aggregation properties at 100 m/min printing | Coverage | Coverage at 100 m/min printing | OD | After aging Coverage |
|---|---|---|---|---|---|---|---|---|---|---|---|---|
| Example 29 | 3a | 3d | 3 | A | 3 | 5 | A | B | B | — | A | C |
| Example 30 | 3a | 3d | 3 | A | 3 | 6 | B | — | B | — | A | B |
| Example 31 | 3a | 3d | 3 | A | 3 | 7 | B | — | A | B | A | A |
| Example 32 | 3a | 3d | 3 | A | 3 | 8 | B | — | B | — | A | B |
| Example 33 | 3a | 3d | 3 | A | 3 | 9 | C | — | A | B | A | A |
| Example 34 | 3a | 3d | 3 | A | 3 | 10 | A | A | A | B | A | A |
| Example 35 | 3a | 3d | 3 | A | 3 | 11 | A | A | B | — | B | B |
| Example 36 | 3a | 3d | 3 | A | 3 | 12 | A | B | A | B | A | A |
| Example 37 | 3a | 3d | 3 | A | 3 | 13 | A | B | A | A | A | A |
| Example 38 | 3a | 3d | 3 | A | 3 | 14 | A | B | B | — | B | B |
| Example 39 | 3a | 3d | 3 | A | 3 | 15 | B | A | A | A | B | A |
| Example 40 | 3a | 3d | 3 | A | 3 | 16 | A | B | A | B | A | A |
| Example 41 | 3a | 3d | 3 | A | 3 | 17 | A | A | B | — | A | B |
| Example 42 | 3a | 3d | 3 | A | 3 | 18 | A | A | A | B | A | A |
| Example 43 | 3a | 3d | 3 | A | 3 | 19 | A | A | A | B | A | A |
| Example 44 | 3a | 3d | 3 | A | 3 | 20 | A | A | A | B | A | A |
| Example 45 | 3a | 3d | 3 | A | 3 | 21 | A | A | A | B | A | B |
| Example 46 | 3a | 3d | 3 | A | 3 | 22 | A | B | B | — | B | B |
| Example 47 | 3a | 3d | 3 | A | 3 | 23 | A | B | B | — | B | B |
| Example 48 | 3a | 3d | 3 | A | 3 | 24 | A | B | A | B | B | B |
| Example 49 | 3a | 3d | 3 | A | 3 | 25 | A | A | A | A | A | A |
| Example 50 | 3a | 3d | 3 | A | 3 | 26 | A | A | A | A | A | A |
| Example 51 | 3a | 3d | 3 | A | 3 | 27 | A | A | A | A | A | A |
| Example 52 | 3a | 3d | 3 | A | 3 | 28 | A | A | A | A | A | A |
| Example 53 | 3a | 3d | 3 | A | 3 | 29 | A | A | B | — | A | B |
| Example 54 | 3a | 3d | 3 | A | 3 | 30 | A | B | A | A | A | A |
| Example 55 | 26a | 26d | 26 | A | 3 | 31 | A | B | B | — | B | C |
| Example 56 | 27a | 27d | 3 | A | 0.4 | 1 | C | — | A | — | B | A |
| Example 57 | 28a | 28d | 3 | A | 12 | 1 | A | — | B | — | B | B |
| Example 58 | 29a | 29d | 2 | B | 3 | 1 | A | — | A | — | A | A |
| Example 59 | 30a | 30d | 3 | B | 3 | 1 | A | — | A | — | A | A |
| Example 60 | 31a | 31d | 4 | B | 3 | 1 | A | — | A | — | A | A |
| Example 61 | 32a | 32d | 3 | C | 3 | 1 | B | — | C | — | C | C |
| Comparative Example 1 | — | — | — | A | — | 1 | D | — | D | — | D | D |
| Comparative Example 2 | 33a | 33d | 27 | A | 3 | 1 | B | — | D | — | D | D |
| Comparative Example 3 | 34a | 34d | 28 | A | 3 | 1 | D | — | B | — | D | B |
| Comparative Example 4 | 35a | 35d | 29 | A | 3 | 1 | D | — | A | — | C | A |
| Comparative Example 5 | 36a | 36d | 30 | A | 3 | 1 | B | — | D | — | C | D |
| Comparative Example 6 | 37a | 37d | 31 | A | 3 | 1 | A | — | D | — | C | D |
| Comparative Example 7 | 38a | 38d | 32 | A | 3 | 1 | D | — | B | — | C | B |
| Comparative Example 8 | 3a | 3d | 3 | A | 3 | 32 | C | — | D | — | D | D |
| Comparative Example 9 | 3a | 3d | 3 | A | 3 | 33 | C | — | D | — | D | D |
| Comparative Example 10 | 3a | 3d | 3 | A | 3 | 34 | C | — | D | — | D | D |
| Comparative Example 11 | 39a | 39d | 27 | B | 3 | 1 | B | — | D | — | D | D |

* In the above table, — indicates that the evaluation was not performed

<Evaluation of Aggregation Properties (Color Mixing)>

Using a microscope, the dot shape of the 4C (CMYK) printed portion of the above printed matter for evaluating the aggregation properties (color mixing) was inspected at a magnification of 200× to evaluate the aggregation properties. The evaluation criteria were as follows, with evaluations of A, B and C deemed to indicate good aggregation properties.

(Evaluation Criteria)
- A: at all three printing speeds, the dots in the 4C printed portion remained independent and no color mixing was observed.
- B: at 40 m/min and 60 m/min, the dots in the 4C printed portion remained independent and no color mixing was observed, but at 80 m/min, color mixing of the dots was observed.
- C: at 40 m/min, the dots in the 4C printed portion remained independent and no color mixing was observed, but at 60 m/min and 80 m/min, color mixing of the dots was observed.
- D: at all three printing speeds, color mixing of the dots in the 4C printed portion was observed.

<Evaluation of Aggregation Properties (Color Mixing) when Printing at 100 m/min>

Among the ink sets that were evaluated above, those that used the recording medium 3a as the recording medium with the applied treatment liquid, and exhibited an evaluation result of A for the aggregation properties were used to produce printed matter under altered printing conditions. In other words, those ink sets for which no color mixing of the dots was observed in the 4C printed portion even when the printing speed was 80 m/min were each used to produce printed matter for evaluating the aggregation properties (color mixing) at a conveyor speed of 100 m/min, and the aggregation properties were then evaluated. The evaluation method was the same as that described above for the aggregation properties, and the evaluation criteria were as follows.

(Evaluation Criteria)
- A: even at a printing speed of 100 m/min, the dots in the 4C printed portion remained independent and no color mixing was observed.
- B: at a printing speed of 100 m/min, color mixing of the dots in the 4C printed portion was observed.

<Evaluation of Coverage (Initial)>

Using a microscope, the solid printed matter described above was inspected at a magnification of 200×, and for each color, an evaluation was made as to whether voids were absent and banding was absent. The evaluation criteria were as follows, with evaluations of A, B and C deemed to indicate good coverage. The evaluation result recorded in Table 6 represents the worst evaluation result among the four colors.

(Evaluation Criteria)
- A: at all three printing speeds, neither voids nor banding was observed.
- B: at 40 m/min and 60 m/min, neither voids nor bands were observed, but at 80 m/min, voids or bands were observed.
- C: at 40 m/min, neither voids nor bands were observed, but at 60 m/min and 80 m/min, voids or bands were observed.
- D: at all three printing speeds, voids or bands were observed.

<Evaluation of Coverage (Initial) when Printing at 100 m/min>

Among the ink sets that were evaluated above, those that used the recording medium 3a as the recording medium with the applied treatment liquid, and exhibited an evaluation result of A for the coverage (initial) were used to produce printed matter under altered printing conditions. In other words, those ink sets for which neither voids nor bands were observed even when the printing speed was 80 m/min were each used to produce printed matter at a conveyor speed of 100 m/min, and the coverage was then evaluated. The evaluation method was the same as that described above for the coverage evaluation, and the evaluation criteria were as follows.

(Evaluation Criteria)
- A: even at a printing speed of 100 m/min, neither voids nor banding was observed.
- B: at a printing speed of 100 m/min, voids or bands were observed.

<Evaluation of Printed Matter OD (Density)>

The OD value of the aforementioned solid printed matter was measured for each color under Status T conditions using a spectroscopic colorimeter X-RITE 528. The passing grade for the measured OD value was set to 1.55 or higher for cyan, 1.50 or higher for magenta, 1.03 or higher for yellow, and 1.70 or higher for black. The number of colors that satisfies the respective passing grade was determined, and the OD was evaluated against the following evaluation criteria. Evaluations of A, B and C were deemed to indicate a favorable level for practical application.

(Evaluation Criteria)
- A: in all of the magenta, yellow, cyan and black regions, the OD value satisfied the passing grade.
- B: in three regions among the magenta, yellow, cyan and black regions, the OD value satisfied the passing grade.
- C: in two regions among the magenta, yellow, cyan and black regions, the OD value satisfied the passing grade.
- D: among the magenta, yellow, cyan and black regions, the OD value satisfied the passing grade for not more than one color.

(4) Evaluation of Ink Sets after Aging

<Production of Ink Sets after Aging>

Ten kg of each of the above treatment liquids 1 to 32 and each of the CMYK inkjet ink sets 1 to 34 was placed in an 18-liter drum, and with the drum unsealed in an open state, the drum was left to stand for one week at room temperature. Subsequently, the solid fraction concentration of each treatment liquid and each inkjet ink was measured, and if the measured value was greater than that prior to the standing period (the initial value), then water was added to adjust the solid fraction concentration to the same as that prior to standing, thus completing preparation of aged treatment liquids 1 to 32 and aged CMYK inkjet ink sets 1 to 34.

<Evaluation of Coverage (after Aging)>

Using the above aged treatment liquids 1 to 32, the same method as that described above was used to produce recording media 1d to 39d with the applied aged treatment liquids. Further, using these recording media 1d to 39d with the applied aged treatment liquids and the aged CMYK inkjet ink sets 1 to 34 described above, the same method as that described above for evaluating the coverage was used to evaluated the coverage after aging. The evaluation criteria were the same as described above. The evaluation results are shown in Table 6.

<Evaluation of Jetting Stability of Inkjet Inks>

Using the method described below, each of the aged CMYK inkjet ink sets 1 to 31 produced in the manner described above was used to evaluate the jetting stability simulating the state following a long run. The evaluation results are shown in Table 7.

First, an inkjet jetting apparatus fitted with four inkjet heads KJ4B-1200 (manufactured by Kyocera Corporation) was prepared, and the K, C, M and Y inkjet inks that constitute the aged CMYK inkjet ink set were used to fill these heads in sequence from the upstream side. Then, under conditions including a drop volume of 3 pl and a drive frequency of 64 kHz, ink was jetted continuously from all of the nozzles for two hours. Subsequently, a nozzle check pattern was printed, and the jetting stability was evaluated by counting the number of missing nozzles. The evaluation criteria were as follows, with evaluations of A, B and C deemed to indicate favorable jetting stability.

- A: in the nozzle check pattern printed 2 hours after starting printing, there were no missing nozzles.
- B: in the nozzle check pattern printed 2 hours after starting printing, there were 1 or 2 missing nozzles.
- C: in the nozzle check pattern printed 2 hours after starting printing, there were 3 or 4 missing nozzles.
- D: in the nozzle check pattern printed 2 hours after starting printing, there were 5 or more missing nozzles.

TABLE 7

| CMYK inkjet ink set | Evaluation results Jetting stability |
|---|---|
| 1 | A |
| 2 | A |
| 3 | A |
| 4 | A |
| 5 | B |
| 6 | A |
| 7 | A |
| 8 | A |
| 9 | A |
| 10 | A |
| 11 | A |
| 12 | A |
| 13 | A |
| 14 | A |
| 15 | A |
| 16 | A |
| 17 | C |
| 18 | A |
| 19 | A |
| 20 | A |
| 21 | A |
| 22 | A |
| 23 | A |
| 24 | A |
| 25 | A |
| 26 | A |
| 27 | A |
| 28 | A |
| 29 | B |
| 30 | A |
| 31 | A |

Based on the above results, it is evident that by using an ink set of the present invention, favorable density and color gamut can be achieved, and images of high image quality with good suppression of image defects such as color mixing caused by dot coalescence and recording medium exposure and banding caused by insufficient coverage can be obtained on various paper media when inkjet printing is conducted at high speed and at high recording resolution.

The invention claimed is:

1. An ink set comprising an inkjet ink, and a treatment liquid used in combination with the inkjet ink, wherein
the inkjet ink comprises a pigment, a water-soluble organic solvent, a surfactant and water,
the water-soluble organic solvent comprises an alkyl diol (A) of 2 to 8 carbon atoms, and a weighted average boiling point of the water-soluble organic solvent at one atmosphere is within a range from 175 to 240° C.,
the surfactant comprises an acetylenediol-based surfactant,
the treatment liquid comprises a coagulant,
calcium nitrate is included as the coagulant in an amount of 6.8 to 20.8% by mass relative to a total mass of the treatment liquid, and
a pH of the treatment liquid is within a range from 2 to 11.

2. The ink set according to claim 1, wherein a pH of the treatment liquid is from 3.5 to 11.

3. The ink set according to claim 1, wherein
the treatment liquid further comprises an organic solvent, and
the organic solvent comprises less than 10% by mass of organic solvent having a boiling point at one atmosphere of at least 240° C. relative to a total mass of the treatment liquid.

4. The ink set according to claim 1, wherein the inkjet ink further comprises a pigment dispersing resin.

5. The ink set according to claim 4, wherein an acid value of the pigment dispersing resin is within a range from 30 to 300 mgKOH/g.

6. The ink set according to claim 4, wherein an acid value of the pigment dispersing resin is from 100 to 300 mgKOH/g.

7. The ink set according to claim 4, wherein the pigment dispersing resin comprises a water-soluble pigment dispersing resin, and a weight average molecular weight (Mw) of the water-soluble pigment dispersing resin satisfies $10,000 \leq Mw \leq 40,000$.

8. The ink set according to claim 1, wherein the alkyl diol (A) has 3 to 6 carbon atoms.

9. The ink set according to claim 1, wherein the treatment liquid also comprises a pH adjuster.

10. The ink set according to claim 1, wherein a viscosity of the treatment liquid is within a range from 5 to 100 mPa·s.

11. The ink set according to claim 1, wherein an amount of the calcium nitrate is within a range from 7.0 to 20.5% by mass relative to a total mass of the treatment liquid.

12. A method for producing inkjet ink printed matter that uses the ink set according to claim 1, the method comprising:
a step of applying the treatment liquid to a recording medium formed from a paper substrate or a synthetic paper substrate, and
a step of applying the inkjet ink by one-pass printing to a portion to which the treatment liquid has been applied.

13. The method for producing inkjet ink printed matter according to claim 12, wherein the step of applying the treatment liquid is conducted so that an amount of calcium ions on a surface of the recording medium is within a range from 0.5 to 5 mmol/m$^2$.

14. A Printed matter obtained by printing the ink set according to claim 1 to a recording medium.

* * * * *